United States Patent
Zuraski, Jr.

(10) Patent No.: US 6,854,050 B1
(45) Date of Patent: Feb. 8, 2005

(54) BRANCH MARKERS FOR RAPIDLY IDENTIFYING BRANCH PREDICTIONS

(75) Inventor: Gerald D. Zuraski, Jr., Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 498 days.

(21) Appl. No.: 10/086,131

(22) Filed: Feb. 28, 2002

Related U.S. Application Data

(62) Division of application No. 09/912,011, filed on Jul. 24, 2001.

(51) Int. Cl.[7] ................................................ G06F 9/38
(52) U.S. Cl. ...................................................... 712/239
(58) Field of Search ........................................ 712/239

(56) References Cited

U.S. PATENT DOCUMENTS

| | | | |
|---|---|---|---|
| 5,608,885 A | | 3/1997 | Gupta et al. |
| 5,729,728 A | | 3/1998 | Colwell et al. |
| 5,933,629 A | * | 8/1999 | Mahalingaiah et al. ..... 712/248 |
| 5,961,638 A | | 10/1999 | Tran |
| 5,978,906 A | * | 11/1999 | Tran .......................... 712/239 |
| 6,279,107 B1 | | 8/2001 | Tran |
| 6,449,714 B1 | * | 9/2002 | Sinharoy .................... 712/240 |
| 6,477,639 B1 | | 11/2002 | Krishnan et al. |

* cited by examiner

*Primary Examiner*—William M. Treat
(74) *Attorney, Agent, or Firm*—Meyertons Hood Kivlin Kowert & Goetzel, P.C.; Rory D. Rankin

(57) ABSTRACT

A method and mechanism for performing branch prediction. A processor is configured with a branch prediction cache which is configured to store branch prediction information corresponding to a group of instructions. Branch marker bits are stored, each of which correspond to a different byte range of a group of instruction bytes. Each branch marker bit provides an indication as to whether or not a predicted branch instruction ends within the corresponding byte range. In response to receiving a fetch address, a corresponding branch marker bit is selected. A determination is made as to whether the selected bit indicates the presence of a predicted branch instruction. A plurality of branch prediction information entries are also maintained. If the selected branch marker bit indicates a predicted branch, the position of the selected branch marker bit relative to other branch marker bits may be used to select a corresponding entry from the branch prediction information entries.

29 Claims, 26 Drawing Sheets

| Offset | <=0 | <=1 | <=3 | <=5 | <=7 | <=9 | <=11 | <=13 | <=15 |
|---|---|---|---|---|---|---|---|---|---|
| Marker Bit # | 0 | 1 | 2 | 3 | 4 | 5 | 6 | 7 | 8 |

*Fig. 6*

BRANCH MARKERS FOR RAPIDLY IDENTIFYING BRANCH PREDICTIONS

CROSS REFERENCE TO RELATED APPLICATIONS

This application is a division of application Ser. No. 09/912,011, filed Jul. 24, 2001.

BACKGROUND OF THE INVENTION

1. Field of the Invention

This invention is related to the field of superscalar microprocessors and, more particularly, to a method and mechanism for branch prediction.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

An important feature of a superscalar microprocessor (and a superpipelined microprocessor as well) is its branch prediction mechanism. The branch prediction mechanism indicates a predicted direction (taken or not-taken) for a branch instruction, allowing subsequent instruction fetching to continue within the predicted instruction stream indicated by the branch prediction. A branch instruction is an instruction which causes subsequent instructions to be fetched from one of at least two addresses: a sequential address identifying an instruction stream beginning with instructions which directly follow the branch instruction; and a target address identifying an instruction stream beginning at an arbitrary location in memory. Unconditional branch instructions always branch to the target address, while conditional branch instructions may select either the sequential or the target address based on the outcome of a prior instruction. Instructions from the predicted instruction stream may be speculatively executed prior to execution of the branch instruction, and in any case are placed into the instruction processing pipeline prior to execution of the branch instruction. If the predicted instruction stream is correct, then the number of instructions executed per clock cycle is advantageously increased. However, if the predicted instruction stream is incorrect (i.e. one or more branch instructions are predicted incorrectly), then the instructions from the incorrectly predicted instruction stream are discarded from the instruction processing pipeline and the number of instructions executed per clock cycle is decreased.

In order to be effective, the branch prediction mechanism must be highly accurate such that the predicted instruction stream is correct as often as possible. Frequently, a history of prior executions of a branch is used to form a more accurate behavior for a particular branch. Such a branch prediction history typically requires maintaining data corresponding to the branch instruction in a storage. In the event the branch prediction data is evicted from the storage, or otherwise lost, it may be necessary to recreate the execution history for the branch instruction at a later time. One solution to the above problem may be to increase the size of the branch prediction storage. However, increasing the size of branch prediction storage may require a significant increase in gate area and the size of the branch prediction mechanism. Consequently, valuable data regarding the behavior of a branch may be lost and must be recreated. Consequently, a mechanism for improving branch prediction capability is desired which does not require a significant increase in the gate count or size of the branch prediction mechanism.

SUMMARY OF THE INVENTION

The problems outlined above are in large part solved by a microprocessor and method as described herein. In one embodiment, a processor is configured with a branch prediction cache which is configured to store branch prediction information corresponding to a group of instructions. In one embodiment branch marker bits are stored, each of which correspond to a different byte range of a group of instruction bytes. Each branch marker bit provides an indication as to whether or not a predicted branch instruction ends within the corresponding byte range. The method further contemplates selecting one of the branch marker bits in response to receiving a fetch address and determining whether the selected bit indicates the presence of a predicted branch instruction.

In one particular embodiment, a plurality of branch prediction information entries are also maintained. Each of the entries is configured to store information corresponding to a predicted taken branch. The branch marker bit which is selected is the first branch marker bit which corresponds to an address at or after the received fetch address. The method further contemplates selecting one of the entries in response to determining the position of the selected branch marker bit relative to other branch marker bits.

BRIEF DESCRIPTION OF THE DRAWINGS

Other objects and advantages of the invention will become apparent upon reading the following detailed description and upon reference to the accompanying drawings in which:

FIG. 6 is a diagram illustrating a relationship between branch marker bits and address offsets.

Figure 1:
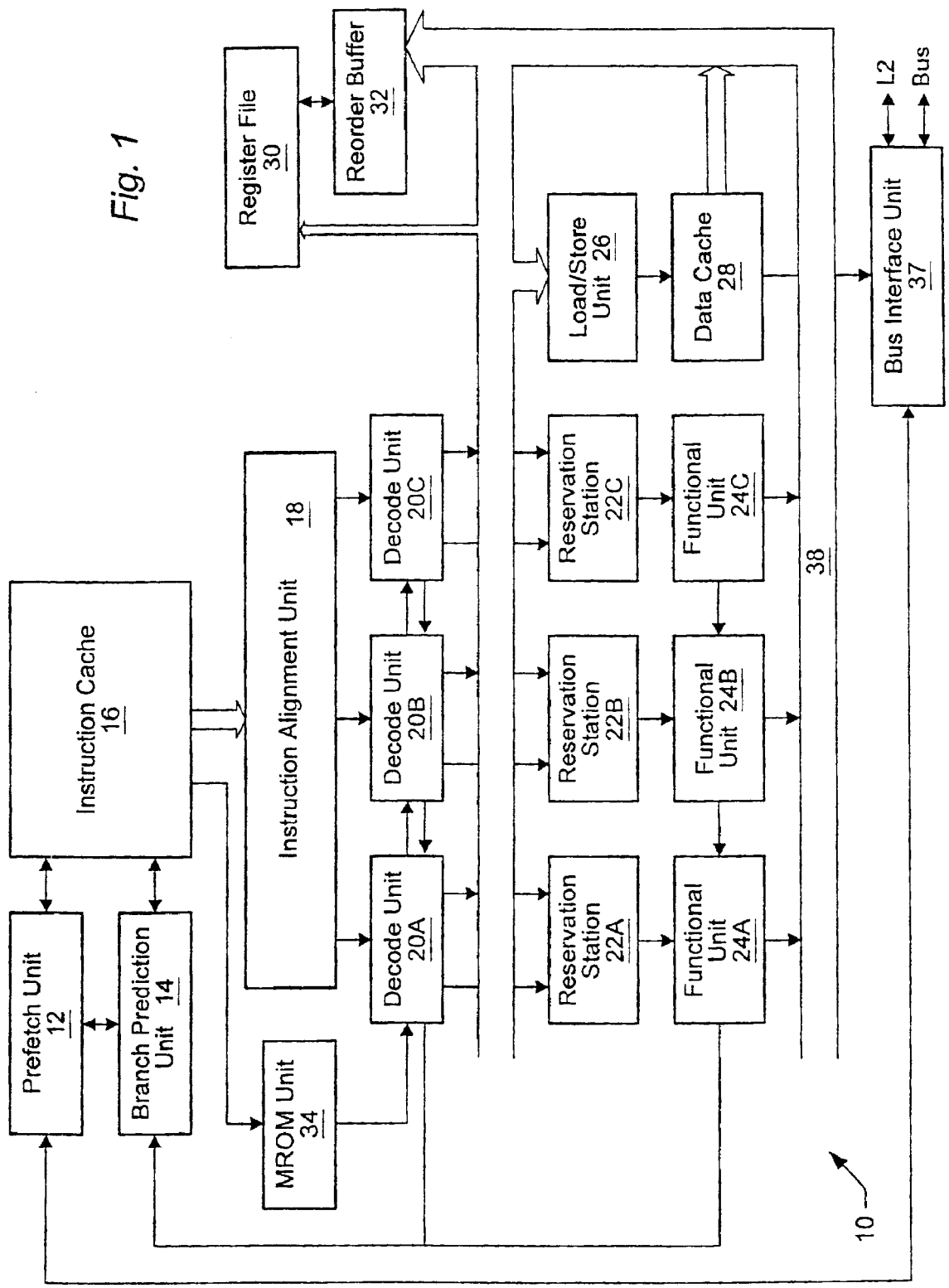
FIG. 1 is a block diagram of one embodiment of a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Processor Overview

Turning now to FIG. 1, a block diagram of one embodiment of a processor 10 is shown. Other embodiments are possible and contemplated. As shown in FIG. 1, processor 10 includes a prefetch unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a bus interface unit 37. Elements referred to herein with a particular reference number followed by a letter will be collectively referred to by the reference number alone. For example, decode units 20A–20C will be collectively referred to as decode units 20.

Prefetch unit 12 is coupled to receive instructions from bus interface unit 37, and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to bus interface unit 37. Bus interface unit 37 is further coupled to an L2 interface to an L2 cache and a bus. Finally, MROM unit 34 is coupled to decode units 20.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 2 way set associative structure having 64 byte lines (a byte comprises 8 binary bits). Alternatively, any other desired configuration and size may be employed. For example, it is noted that instruction cache 16 may be implemented as a fully associative, set associative, or direct mapped configuration.

Instructions are stored into instruction cache 16 by prefetch unit 12. Instructions may be prefetched prior to the request thereof from instruction cache 16 in accordance with a prefetch scheme. A variety of prefetch schemes may be employed by prefetch unit 12. Instructions fetched from the instruction cache are passed to the scanner/aligner. When instructions are fetched for the first time, they are not marked by predecode tags. In this case, the scanner/aligner passes 4 bytes per clock to the decode unit 20. As decode unit 20 dispatches unpredecoded instructions to the core, the decode unit may generate predecode data corresponding to the instructions which indicates the instruction boundaries.

One encoding of the predecode tags for an embodiment of processor 10 employing a variable byte length instruction set will next be described. A variable byte length instruction set is an instruction set in which different instructions may occupy differing numbers of bytes. An exemplary variable byte length instruction set employed by one embodiment of processor 10 is the x86 instruction set.

In the exemplary encoding, if a given byte is the last byte of an instruction, the end bit for that byte is set. Instructions which may be directly decoded by decode units 20 are referred to as "fast path" instructions. The remaining x86 instructions are referred to as MROM instructions, according to one embodiment. For example, a fast path instruction including two prefix bytes, a Mod R/M byte, and an immediate byte would have end bits as follows:

End bits 00001

MROM instructions are instructions which are determined to be too complex for decode by decode units 20. MROM instructions are executed by invoking MROM unit 34. More specifically, when an MROM instruction is encountered, MOM unit 34 parses and issues the instruction into a subset of defined fast path instructions to effectuate the desired operation. MROM unit 34 dispatches the subset of fast path instructions to decode units 20.

Processor 10 employs branch prediction in order to speculatively fetch instructions subsequent to conditional branch instructions. Branch prediction unit 14 is included to perform branch prediction operations. In one embodiment, branch prediction unit 14 employs a branch target buffer which caches up to three branch target addresses and corresponding taken/not taken predictions per 16 byte portion of a cache line in instruction cache 16. The branch target buffer may, for example, comprise 2048 entries or any other suitable number of entries. Prefetch unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of processor 10. In an alternative configuration, branch prediction unit 14 may be coupled to reorder buffer 32 instead of decode units 20 and functional units 24, and may receive branch misprediction information from reorder buffer 32. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 scans the predecode data to align an instruction to each of decode units 20. In one embodiment, instruction alignment unit 18 aligns instructions from two sets of sixteen instruction bytes to decode units 20. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction. In one particular embodiment, each instruction is decoded into up to two operations which may be separately executed by functional units 24A–24C.

Processor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to five pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. In one embodiment, reorder buffer 32 includes a future file which receives operand requests from decode units as well. Those of skill in the art will appreciate that the x86 register file includes eight 32 bit real registers (i.e., typically referred to as EAX, EBX, ECX, EDX, EBP, ESI, EDI and ESP). In embodiments of processor 10 which employ the x86 processor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are issued by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of processor 10, including using a future file to store the speculative state of register file 30.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case. In embodiments in which instructions may be decoded into multiple operations to be executed by functional units 24, the operations may be scheduled separately from each other.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 or reorder buffer 32 and subsequently communicating with reorder buffer 32 to complete the instructions. Additionally, functional units 24 may be configured to perform address generation for load and store memory operations performed by load/store unit 26. In one particular embodiment, each functional unit 24 may comprise an address generation unit for generating addresses and an execute unit for performing the remaining functions. The two units may operate independently upon different instructions or operations during a clock cycle.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32. It is further noted that branch execution results may be provided by functional units 24 to reorder buffer 32, which may indicate branch mispredictions to functional units 24.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with two load/store buffers. The first load/store buffer includes storage locations for data and address information corresponding to pending loads or stores which have not accessed data cache 28. The second load/store buffer includes storage locations for data and address information corresponding to loads and stores which have accessed data cache 28. For example, the first buffer may comprise 12 locations and the second buffer may comprise 32 locations. Decode units 20 arbitrate for access to the load/store unit 26. When the first buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between processor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 processor architecture.

Data cache 28 is a high speed cache memory provided to temporarily store data being transferred between load/store unit 26 and the main memory subsystem. In one embodiment, data cache 28 has a capacity of storing up to 64 kilobytes of data in an two way set associative structure. It is understood that data cache 28 may be implemented in a variety of specific memory configurations, including a set associative configuration, a fully associative configuration, a direct-mapped configuration, and any suitable size of any other configuration.

In one particular embodiment of processor 10 employing the x86 processor architecture, instruction cache 16 and data cache 28 are linearly addressed and physically tagged. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. The physical address is compared to the physical tags to determine a hit/miss status.

Bus interface unit 37 is configured to communicate between processor 10 and other components in a computer system via a bus. For example, the bus may be compatible with the EV-6 bus developed by Digital Equipment Corporation. Alternatively, any suitable interconnect structure may be used including packet-based, unidirectional or bi-directional links, etc. An optional L2 cache interface may be employed as well for interfacing to a level two cache.

For the remainder of this description, the x86 microprocessor architecture will be used as an example. However, the branch prediction technique described herein may be employed within any microprocessor architecture, and such embodiments are contemplated. It is noted that, in the x86 microprocessor architecture, there is defined a subroutine return instruction (e.g. the RET instruction) consisting of a single byte opcode. The subroutine return instruction specifies that its branch target address is drawn from the top of the stack indicated by the ESP register. Handling of this single byte RET instruction may present special issues in some circumstances. A mechanism for dealing with this case is illustrated in more detail below.

Branch Prediction Overview

Figure 2:
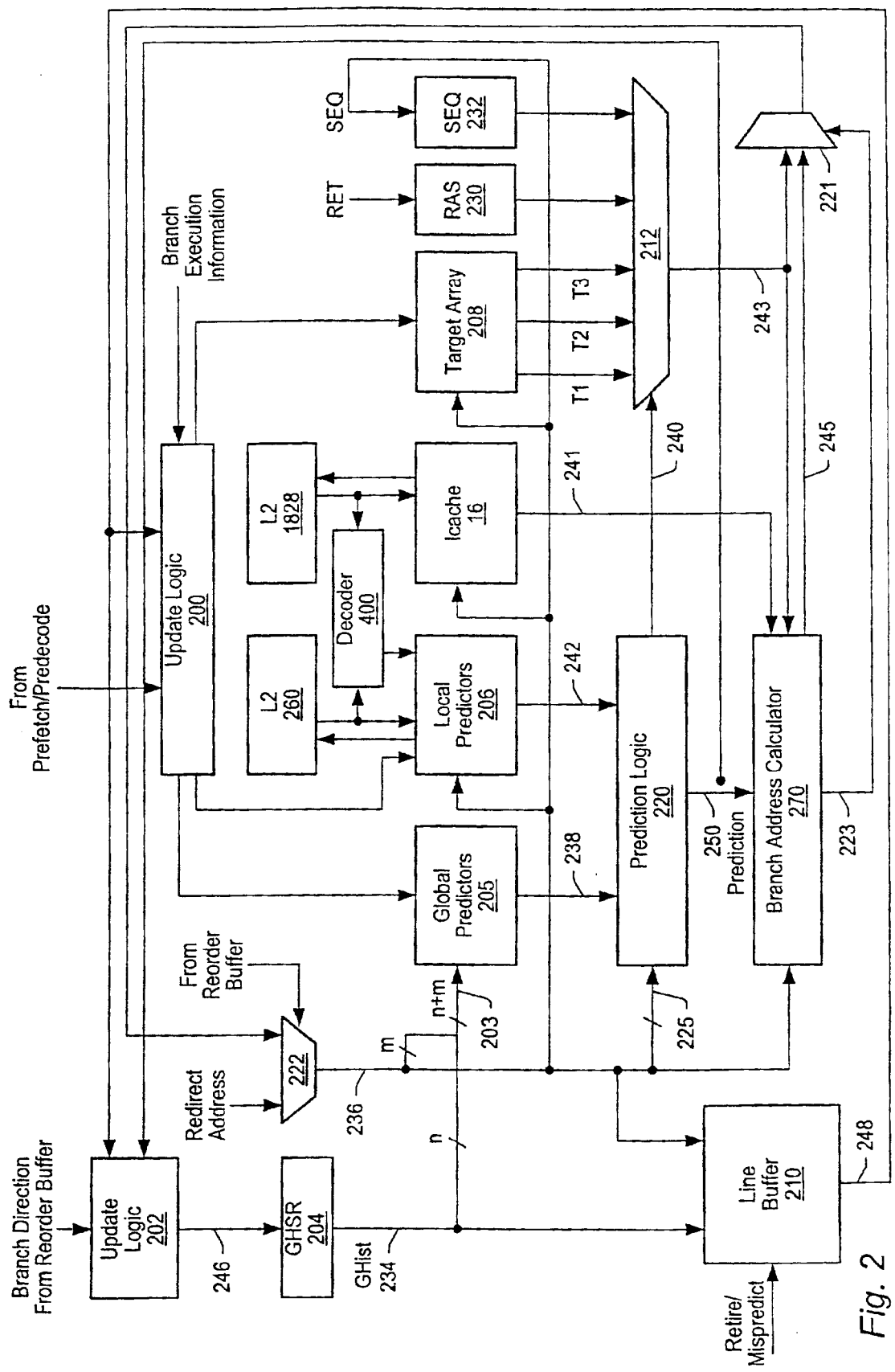
FIG. 2 is a block diagram showing one embodiment of a branch prediction unit.

FIG. 2 shows a portion of one embodiment of branch prediction unit 14. Other embodiments of branch prediction unit 14 in addition to the portion shown in FIG. 2 are possible and are contemplated. As shown in FIG. 2, branch prediction unit 14 includes global predictor storage 205, local predictor storage 206, branch target storage 208, update logic 200 and 202, global history shift register 204, line buffer 210, return address stack 230, sequential address generator 232, prediction logic 220, victim cache 260, branch address calculator 270, instruction cache 16, L2 cache 1828, and decoder circuit 400. Victim cache 260 is a level two (L2) cache configured to store branch prediction information evicted from local predictor storage 206. In one embodiment, victim cache 260 is configured to cache only data that was previously held in local predictor storage 206 but was evicted to make room for other data. Advantageously, because local predictor storage 206 and victim cache 260 do not store duplicate data, more branch prediction information may be maintained.

Global predictor storage 205, local predictor storage 206, branch target storage 208, instruction cache 16, prediction logic 220, branch address calculator 270, and line buffer 210 are coupled to a fetch address bus 236 from fetch address multiplexor 222. Global history shift register 204 is coupled to global predictor storage 205 and line buffer 210 via bus 234. Update logic 200 is coupled to global predictor storage 205, local predictor storage 206 and branch target storage 208. Line buffer 210 is coupled to update logic 200 and 202 via bus 248. In addition, update logic 202 is coupled to global history shift register 204 via bus 246. Reorder buffer 32 provides selection control and a redirect address to multiplexor 222. Reorder buffer 32 also provides branch predicted behavior and actual behavior information to update logic 200 and update logic 202. Global predictor storage 205 and local prediction storage 206 are coupled to prediction logic 220 via buses 238 and 242, respectively. Prediction logic 220 is coupled to branch address calculator 270 via bus 250 and multiplexor 212 via select signal 240. Instruction cache 16 is coupled to branch address calculator 270 via bus 241. Multiplexor output 212 is coupled to branch address calculator 270 and multiplexor 221 via bus 243. And branch address calculator 270 is coupled to multiplexor 221 via bus 245, and multiplexor 221 via select signal 223. Finally, the output from multiplexor 221 is coupled to multiplexor 222.

In general, the basic operation of the portion of branch prediction unit 14 shown in FIG. 2 is as follows. A fetch address 236 is conveyed to line buffer 210, local predictor storage 206, target array storage 208 and branch address calculator 270. In addition, a portion of the fetch address 236 is combined with global history 234 to form an index into global predictor storage 205. Further, a portion 225 of fetch address 236 is conveyed to prediction logic 220. Global predictor storage 205 conveys a global prediction 238, local predictor storage 206 conveys a local prediction 242 and target array 208 conveys a target address corresponding to the received fetch address. The local prediction 242 conveyed by local predictor storage 206 provides information to prediction logic 220 for use in forming a branch prediction. Likewise, global predictor storage 205 conveys a global prediction 238 to prediction logic 220 for use in forming the branch prediction. In one embodiment, global prediction 238 may override a local prediction 242 provided by local predictor storage 206 for branches which have exhibited dynamic behavior. Classification of branches as exhibiting dynamic behavior will be discussed below. Finally, prediction logic 220 conveys a signal to multiplexor 212 which selects a next fetch address 243 for use in fetching new instructions. In certain instances, the fetch address 243 conveyed by multiplexor 212 will be the only fetch address conveyed for the current branch prediction. However, in other cases, branch address calculator 270 may convey a second fetch address 245 corresponding to the current branch prediction in response to determining the fetch address 243 conveyed by multiplexor 212 was incorrect. In such a case, branch address calculator 270 may convey a signal 223 for selecting fetch address 245 for output from multiplexor 221. In this manner, a misprediction may be determined and corrected at an early stage.

Dynamic Behavior and Global Classification

As mentioned above, in one embodiment a global prediction mechanism may be included in branch prediction unit 14. Details of a global prediction mechanism may be found in the following co-pending, commonly assigned patent application: "Dynamic Classification of Conditional Branches in Global History Branch Prediction", Ser. No. 09/441,630, filed Nov. 16, 1999 by Zuraski, Jr. et al., the disclosures of which is incorporated herein by reference. As previously indicated, prefetch unit 12 may be configured to detect branch instructions and to convey branch information corresponding to a branch instruction to branch prediction unit 14. When a conditional branch is detected, update logic 200 may create a corresponding branch prediction entry in local predictor storage 206 and initialize the newly created branch prediction entry to not taken. In one embodiment, local predictor storage 206 may store branch prediction information, including branch markers, for use in making a branch prediction and choosing from among a plurality of branch target addresses stored in branch target storage 208, a sequential address 232, or return stack address 230. Upon creating an entry in local predictor storage 206 for a branch, the predicted direction of the branch is initialized to not taken and the corresponding branch marker is initialized to indicate a sequential address 232. In addition, an entry corresponding to a conditional branch is created in line buffer 210. A line buffer entry may comprise a global history, fetch address, global prediction and global bit.

When a branch has a not taken prediction in local predictor storage 206, a sequential address 232 is conveyed from multiplexor 212. Final prediction 250 is conveyed to update logic 202 which shifts the predicted direction of branches classified as dynamic into global history shift register 204. When a local branch prediction entry indicates a branch is predicted not taken, final prediction 250 indicates the branch is not taken and signal 240 selects sequential address 232 from multiplexor 212 as the next fetch address. On subsequent executions of the branch, prior to the branch prediction entry being deleted from branch prediction unit 14, the predicted direction for the branch is not taken and the sequential address 232 is conveyed as the next fetch address. Upon retirement, the corresponding entry in line buffer 210 is conveyed to update logic 200 and update logic 202 and deleted from line buffer 210. When a line buffer entry indicates a branch is classified as non-dynamic and reorder buffer 32 indicates the branch was correctly predicted, no update by update logic 200 or 202 is performed. However, if the branch was classified as non-dynamic and was mispredicted, the branch prediction corresponding to the mispredicted branch is updated and the global history shift register 204 is updated as discussed below.

Non-Dynamic—Taken Branches

Upon retirement or mispredict, reorder buffer 32 conveys information regarding the behavior of a branch to update logic 200. Also, line buffer 210 conveys a line buffer entry to update logic 200 and 202. When a line buffer branch entry indicates a branch is classified as non-dynamic and predicted not taken, and reorder buffer 32 indicates the corresponding branch was mispredicted, update logic 200 updates the branch prediction entry corresponding to the mispredicted branch. Update logic 200 updates the branch prediction in local predictor storage 206 from not taken to taken and enters the branch target address in branch target storage 208. A "dynamic" (or "global") bit associated with the stored branch target address is initialized to indicate the branch is classified as static, or non-dynamic, which may be represented by a binary zero. On subsequent executions of the branch, and prior to the branch prediction entry being deleted from branch prediction unit 14, the branch prediction entry indicates a taken prediction and a classification of non-dynamic. When a branch is predicted taken and classified as non-dynamic, prediction logic 220 selects a target from multiplexor 212. As before, if the branch is correctly predicted no branch prediction update is required by update logic 200 or 202. On the other hand, if a non-dynamic predicted taken branch is not taken, the branch prediction entry and global history shift register 204 are updated.

Dynamic Branches

When a branch which is classified as non-dynamic and predicted taken is mispredicted, update logic 200 updates the dynamic bit corresponding to the mispredicted branch in local predictor storage 206 to indicate the branch is classified as dynamic, or global. In addition, update logic 200 updates the global prediction entry in global prediction storage 204 corresponding to the mispredicted branch to indicate the branch is predicted not taken. Also, update logic 202 updates global history shift register 204 to indicate the branch was not taken. In one embodiment, global history shift register 204 tracks the behavior of the last 8 dynamic branches.

When a dynamic branch is fetched, fetch address 236 is conveyed to local predictor storage 206, target array 208 and line buffer 210. In addition, the fetch address is combined with the contents of global history shift register 204 to form an index 203 which is conveyed to global predictor storage 205. The contents of global history shift register 204 are also conveyed to line buffer 210 via bus 234. In one embodiment, index 203 is formed by concatenating bits 9 through 4 of the fetch address 236 with the contents of global history shift register 204. Other methods of forming an index, such as ORing or XORing, are contemplated as well. The index selects an entry in global predictor storage 205 which is conveyed to line buffer 210, update logic 202 and multiplexor 220. The predicted direction of the branch conveyed by global predictor storage 204 is shifted into the global history shift register 204 by update logic 202. For example, a binary one may represent a taken branch and a binary zero may represent a not taken branch. If the corresponding dynamic bit indicates the branch is classified as global and the global prediction indicates the branch is taken, the target address conveyed from multiplexor 212 is selected as the next fetch address. If the global prediction indicates the branch is not taken, the sequential address 232 is selected from multiplexor 212 as the next fetch address.

Upon retirement, reorder buffer 32 conveys branch information to update logic 200 and update logic 202. In addition, line buffer 210 conveys the corresponding branch information to update logic 202. When reorder buffer 32 indicates a dynamic branch is correctly predicted, update logic 200 modifies global prediction entry 205 to indicate the behavior of the branch. In one embodiment, global branch prediction entries comprise a saturating counter. Such a counter may be two bits which are incremented on taken branches and decremented on not taken branches. Such an indicator may be used to indicate a branch is strongly taken, weakly taken, strongly not taken, or weakly not taken. If a dynamic branch is mispredicted, update logic 200 updates the global prediction entry 205 to indicate the branch behavior. In addition, upon misprediction update logic 202 repairs global history shift register 204 to reflect the actual, rather than the predicted, behavior of the dynamic branch.

Victim Branch Prediction Cache

The above overview of branch prediction unit 14 operation assumes a branch prediction for a corresponding fetch address exists in local predictor storage 206. However, a branch prediction corresponding to a received fetch address may not exist in local predictor storage 206. A general overview of a method for handling this scenario will be discussed next.

Figure 3:
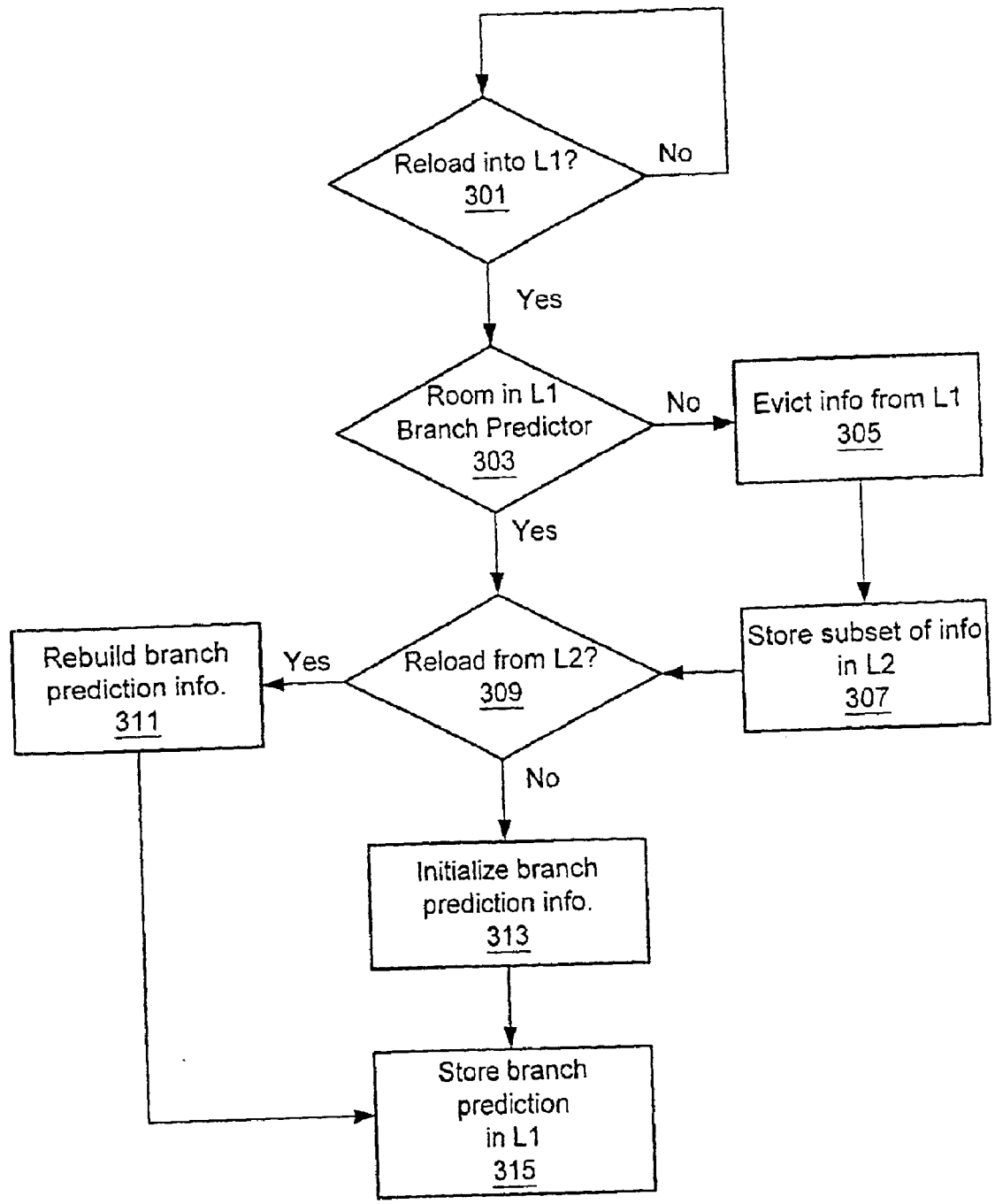
FIG. 3 is a flowchart illustrating a method for branch prediction.

FIG. 3 is a flowchart illustrating one embodiment of a method for creating a branch prediction entry in a first level (L1) branch prediction storage 206 which includes by evicting an existing branch prediction entry and storing a subset of the evicted branch prediction information in a second level (L2) storage. Utilization of a second level branch prediction storage 260 advantageously allows the retention of branch prediction information which is evicted from the L1 predictor storage 206. Those skilled in the art will recognize that making an accurate prediction for a particular branch may require the creation of a branch execution history over a number of executions of a branch. Consequently, retaining branch prediction information corresponding to an evicted branch prediction in a cache may improve the accuracy of branch predictions. Upon detecting a required reload into L1 storage 206 (decision block 301) a determination is made (decision block 303) as to whether there exists room in the corresponding entry of the L1 branch predictor storage 206 for a branch prediction. In the event the entry in the L1 branch predictor storage 206 which corresponds to the reload data is already occupied, the existing entry may be evicted (block 305) and only a subset of the evicted branch prediction information is stored in the L2 storage 260 (block 307). If the reload data is being fetched from the L2 storage 260 (decision block 309), the data fetched from the L2 storage 260 includes a subset of branch prediction entry which may be used to rebuild a corresponding full branch prediction entry (block 311). The rebuilt entry may then be stored in the L1 storage 206 (block 315). Alternately, if the reload data is not being fetched from the L2 storage 260 (decision block 309), a new branch prediction entry is initialized (block 313) and stored in the L1 storage (block 315).

Figure 4:
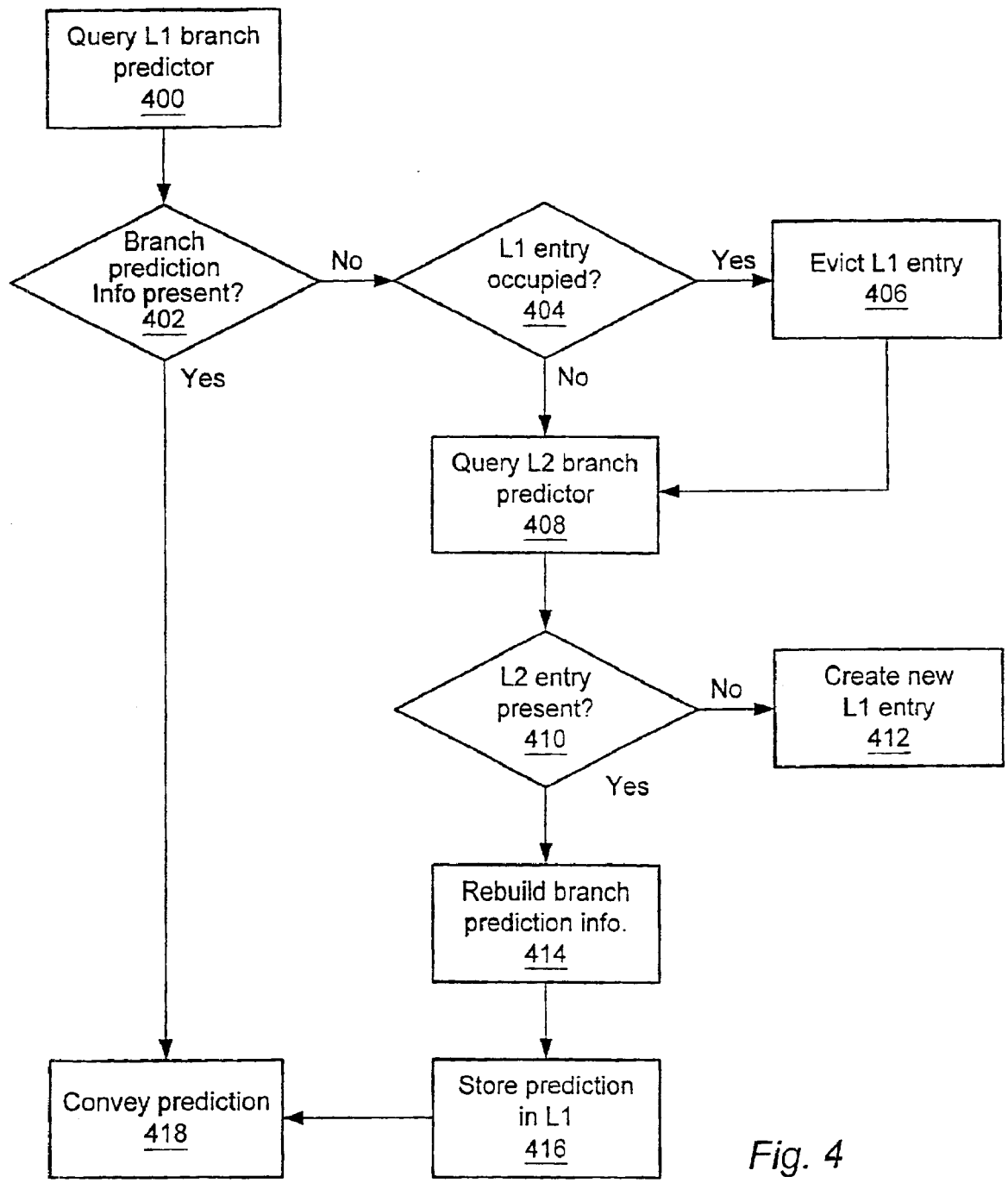
FIG. 4 is a flowchart illustrating a method for utilizing a level two branch prediction cache.

FIG. 4 illustrates an alternate embodiment of a method wherein a corresponding branch prediction is not present in an L1 branch predictor storage. Initially, a fetch address is presented to an L1 branch predictor storage 206 (block 400). Upon presentation of the fetch address, a determination is made as to whether a branch prediction corresponding to the presented fetch address is present in the L1 predictor storage (decision block 402). In the event a corresponding branch prediction is present in the L1 storage, the prediction is conveyed (block 418). However, in the event there is no corresponding branch prediction in the L1 storage 206, a determination is made as to whether the entry in the L1 predictor storage 206 that corresponds to the fetch address is occupied by a branch prediction entry corresponding to an alternate fetch address (decision block 404). If another entry is present in the L1 predictor storage 206, the existing entry is evicted from the L1 predictor storage 206 (block 406). If the corresponding L1 predictor storage entry is not occupied by a valid entry, an L2 predictor storage 260 is queried for a branch prediction entry corresponding to the fetch address (block 408). In one embodiment, L1 predictor storage 206 and L2 predictor storage 260 may be queried in parallel. If no corresponding entry is present in the L2 predictor storage 260 (block 410), a new branch prediction entry may be created in the L1 predictor storage 206 for the presented fetch address (block 412). On the other hand, if there exists an entry in the L2 branch predictor storage 260 corresponding to the fetch address, data from the L2 entry is utilized to rebuild a full branch prediction corresponding to the fetch address (block 414). The rebuilt branch prediction is then stored in the L1 branch predictor storage (block 416) and is conveyed (block 418) for use in making a branch prediction. Advantageously, branch prediction information corresponding to a branch instruction may be recovered from an L2 branch predictor storage, rather than having to rebuild it through a history of branch executions. Further, only a subset of information corresponding to the branch prediction need be stored in the L2 branch prediction storage 260. In this manner, the size of the L2 branch prediction storage 260 may be made smaller.

Local Branch Predictor Storage

In one embodiment, local predictor storage 206 may be organized in the same manner as instruction cache 16. Data stored in local predictor storage 206 may consist of lines of storage organized in ways. In one embodiment, local predictor storage 206 is of sufficient size to cover all entries in the instruction cache 16. In an alternative embodiment, local predictor storage 206 may be smaller than instruction cache 16. For example, local predictor storage 206 may be ¼ the size of instruction cache 16. In such an embodiment, additional bits may be stored along with a local prediction in local predictor storage 206 in order to distinguish entries for multiple fetch addresses which index to the same storage location within local predictor storage 206. In one embodiment, global predictor storage 205 may be configured such that a single storage location provides a prediction for more than one fetch address. Those skilled in the art will readily recognize numerous possible configurations for local predictor storage 206 and global predictor storage 205 are possible.

Figure 5:
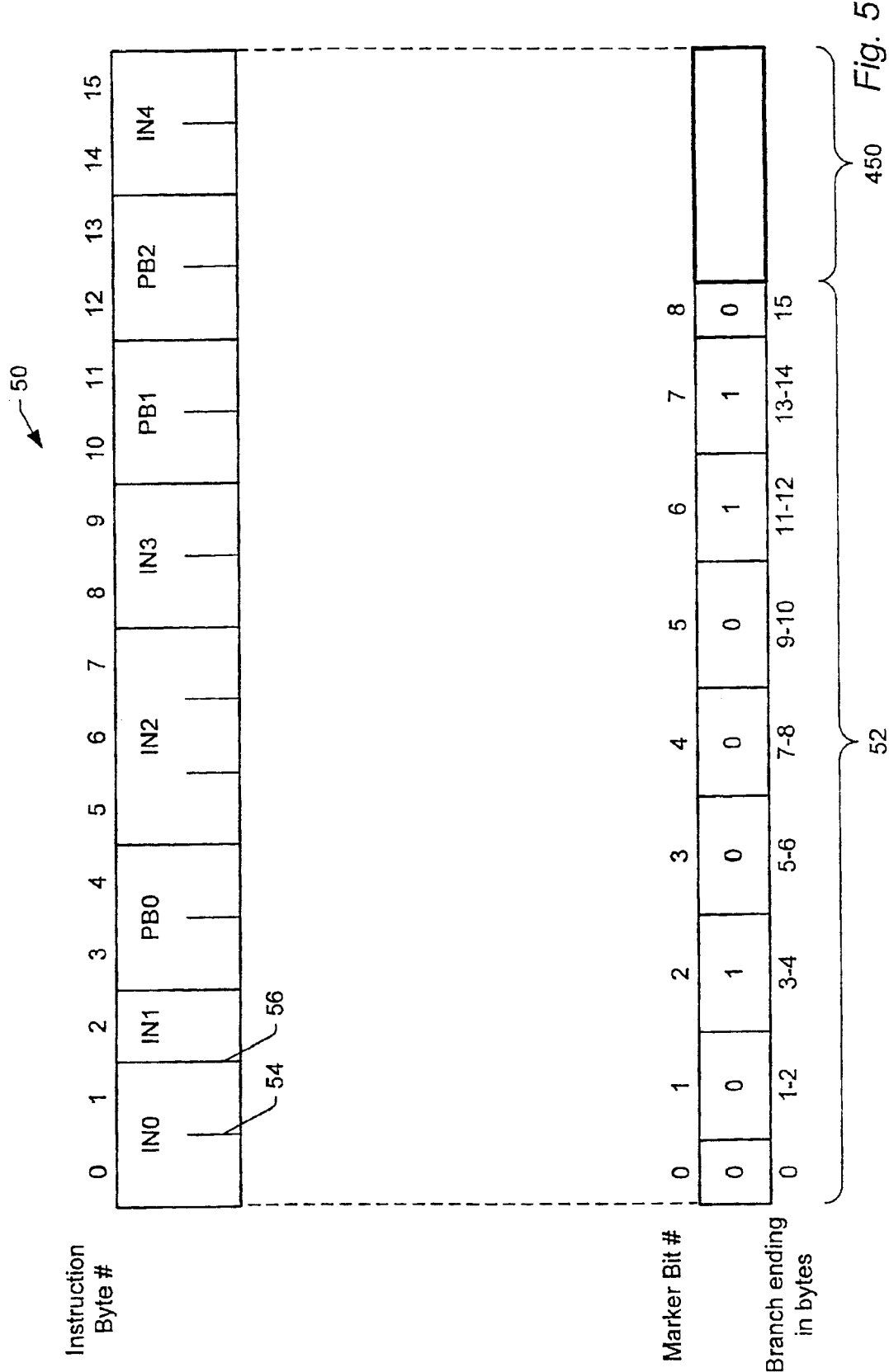
FIG. 5 is a diagram showing a contiguous group of program instructions and corresponding branch prediction entry.

Turning now to FIG. 5, a diagram of an exemplary group of contiguous instruction bytes 50 and a corresponding entry in local predictor storage 206 are shown. In FIG. 5, each byte within an instruction is illustrated by a short vertical line (e.g., reference number 54). Additionally, the vertical lines separating instructions in group 50 delimit bytes (e.g. reference number 56). The instructions shown in FIG. 5 are variable in length, and therefore the instruction set, including the instructions shown in FIG. 5, is a variable byte length instruction set. In other words, a first instruction within the variable byte length instruction set may occupy a first number of bytes which is different than a second number of bytes occupied by a second instruction within the instruction set. Other instruction sets may be fixed-length, such that each instruction within the instruction set occupies the same number of bytes as each other instruction.

As illustrated in FIG. 5, group 50 includes non-branch instructions IN0–IN4. Instructions IN0, IN3, and IN4, are two byte instructions. Instruction IN1 is a one byte instruction and instruction IN2 is a three byte instruction. Three predicted-taken branch instructions PB0, PB1, and PB2 are illustrated as well, each shown as occupying two bytes. It is noted that both non-branch and branch instructions may occupy various numbers of bytes.

As used herein, the offset of an address comprises a number of least significant bits of the address. The number is sufficient to provide different encodings of the bits for each byte within the group of bytes to which the offset relates. For example, group 50 is 16 bytes, bytes 0–15. Therefore, four least significant bits of an address within the group form the offset of the address. The remaining bits of the address identify group 50 from other groups of contiguous instruction bytes within the main memory. Additionally, a number of least significant bits of the remaining bits form an index used by instruction cache 16 to select a row of storage locations which are eligible for storing group 50.

Set 52 is an exemplary set of nine branch marker bits 0–8 corresponding to group 50. Each of the nine branch marker bits within set 52 corresponds to particular bytes of group 50 and indicate whether a predicted taken branch instruction ends within the corresponding bytes. In the embodiment shown, branch marker bit 0 corresponds to instruction byte 0, branch marker bit 1 corresponds to instruction bytes 1–2, branch marker bit 2 corresponds to instruction bytes 3–4, branch marker bit 3 corresponds to instruction bytes 5–6, branch marker bit 4 corresponds to instruction bytes 7–8, branch marker bit 5 corresponds to instruction bytes 9–10, branch marker bit 6 corresponds to instruction bytes 11–12, branch marker bit 7 corresponds to instruction bytes 13–14, and branch marker bit 8 corresponds to instruction byte 15. In addition to branch marker bits 52, branch prediction information 450 corresponding to branch marker bits 52 is also included. Branch prediction information 450 includes information corresponding to predicted taken branches and may be used in making a branch prediction as discussed further below.

In the embodiment shown in FIG. 5, a branch marker bit is set to "1" to indicate a predicted taken branch instruction ends within the corresponding byte range. If no predicted taken branch instruction ends within the byte range corresponding to a branch marker bit, the branch marker bit is set to "0". Consequently, branch marker bit two is set to indicate a predicted taken branch, PB0, ends within the instruction byte range 3–4. Branch marker bit six is set to indicate a predicted taken branch, PB1, ends within instruction byte range 11–12. Finally, branch marker bit seven is set to indicate a predicted taken branch, PB2, ends within instruction byte range 13–14. In one embodiment, up to three predicted taken branches may be indicated by branch marker bits 52. In such an embodiment, branch prediction information 450 may contain information pertaining to three separate branch instructions. Such information 450 may include the type of branch instruction and indicate information on the past behavior of the corresponding branch. Branch prediction information 450 will be discussed further in the discussion of FIG. 15.

Figure 6:
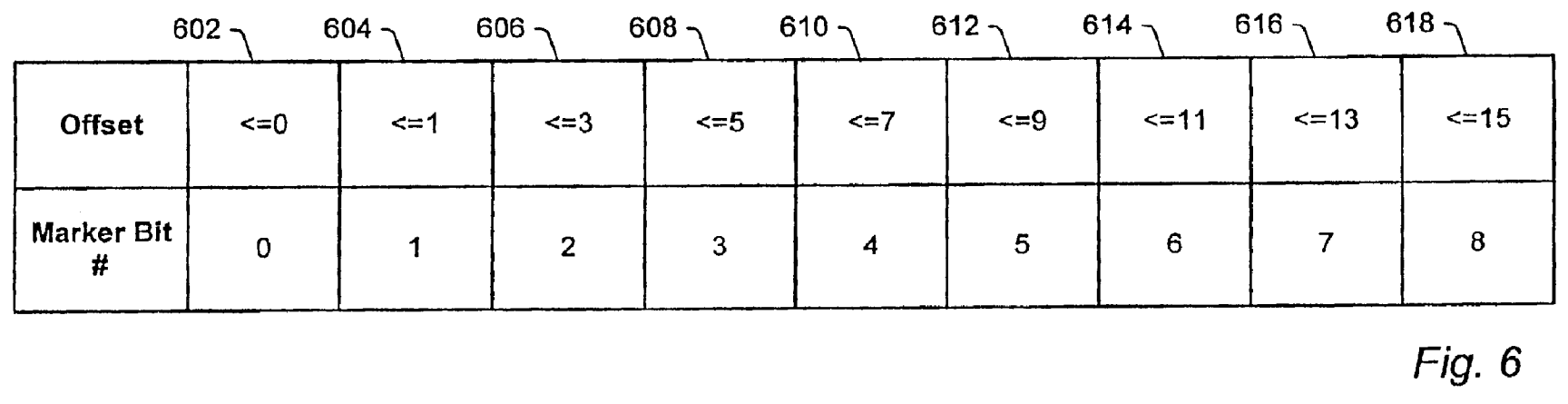

Upon presentation of a fetch address to local predictor storage 206, a group of branch marker bits 52 and branch information 450 are conveyed to prediction logic 220 for use in making a branch prediction. In one embodiment, the offset of the fetch address may be used to identify which of the branch marker bits 52 are to be considered in making a branch prediction. Turning to FIG. 6, one embodiment of a relationship between branch marker bits 52 and fetch address offsets is shown. In FIG. 6, a table with columns 602–618 includes an offset address and a corresponding branch marker bit. In general, whether or not a branch marker bit is considered in making a prediction depends on whether the corresponding offset satisfies the condition indicated in the table. For example, column 602 illustrates that if the offset of an address is less than or equal to zero, then all branch marker bits will be considered in making a branch prediction. In this manner, the table shows the lowest numbered branch marker bit that will be considered for a given offset. Consequently, if an offset is equal to seven, then branch marker bits four through eight will be considered. If an offset is equal to fifteen, then only branch marker bit eight will be considered.

Figure 7:
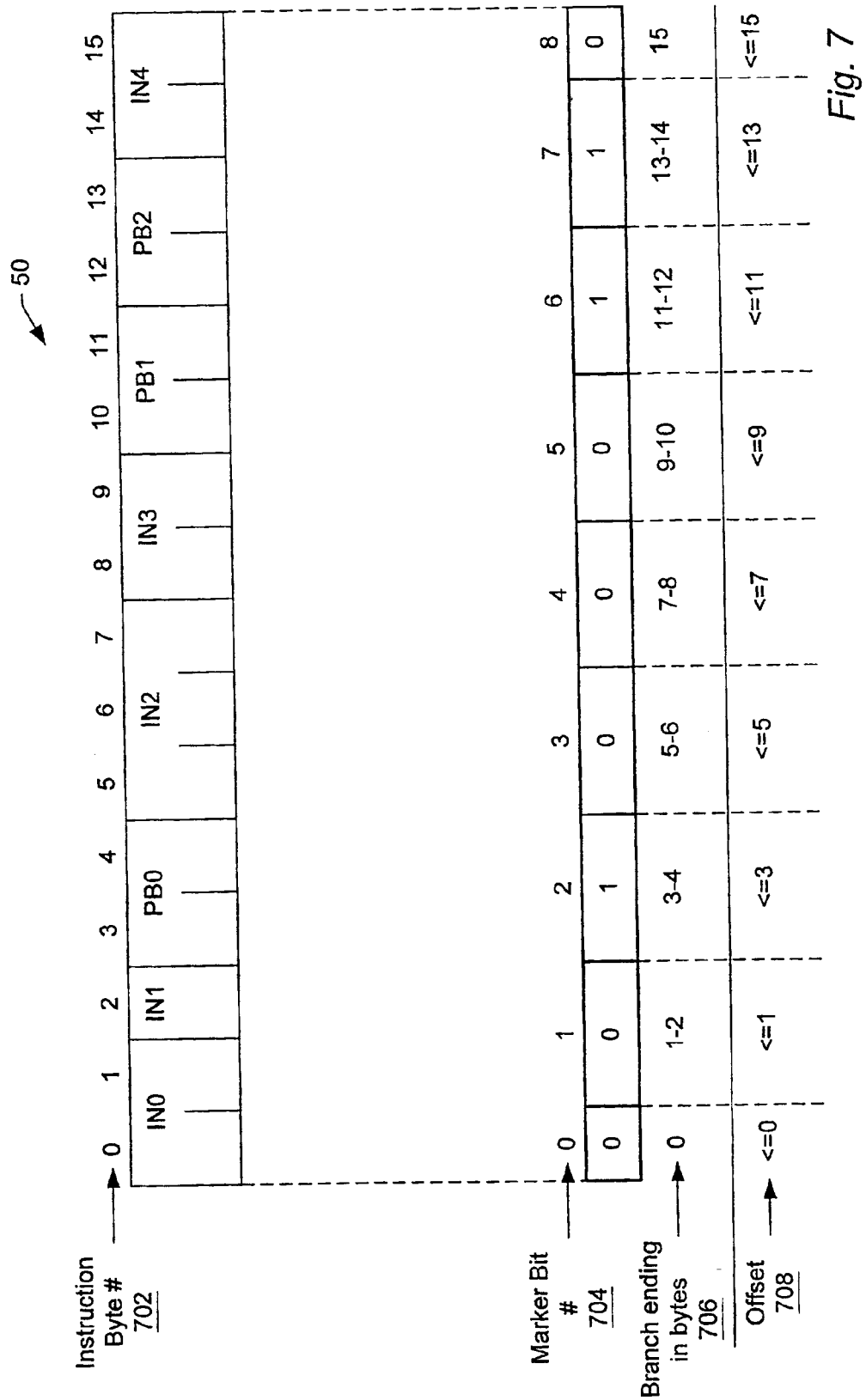
FIG. 7 is a diagram illustrating a relationship between program instructions, branch marker bits and address offsets.

Turning now to FIG. 7, a diagram illustrating the above described relationships between instruction bytes and branch marker bits is shown. FIG. 7 shows instruction bytes 50 and corresponding branch marker bits. Also illustrated are the instruction byte# 702, branch marker bit# 704, the instruction bytes to which each branch marker bit corresponds 706, and the fetch address offset 708 which corresponds to each branch marker bit. Branch information 450 is not shown. As discussed with reference to FIG. 5, three predicted taken branch instructions, PB0–PB2, are shown with corresponding branch marker bits 2, 6 and 7 being set. As an example, assume a fetch address with an offset of 3 is presented to local predictor storage 206. In such a scenario, branch marker bits 2–8 all satisfy the conditions of the respective bit (i.e., offset<=3 for branch marker bit 2, offset<=5 for branch marker bit 3, etc.). Consequently, branch marker bits 2–8 are utilized and branch marker bits 0–1 may be effectively ignored when making a branch prediction as they correspond to an instruction prior in sequence to the instruction currently being fetched. In this manner, determining which branch marker bits to consider in making a prediction may be readily ascertained.

Figure 8:
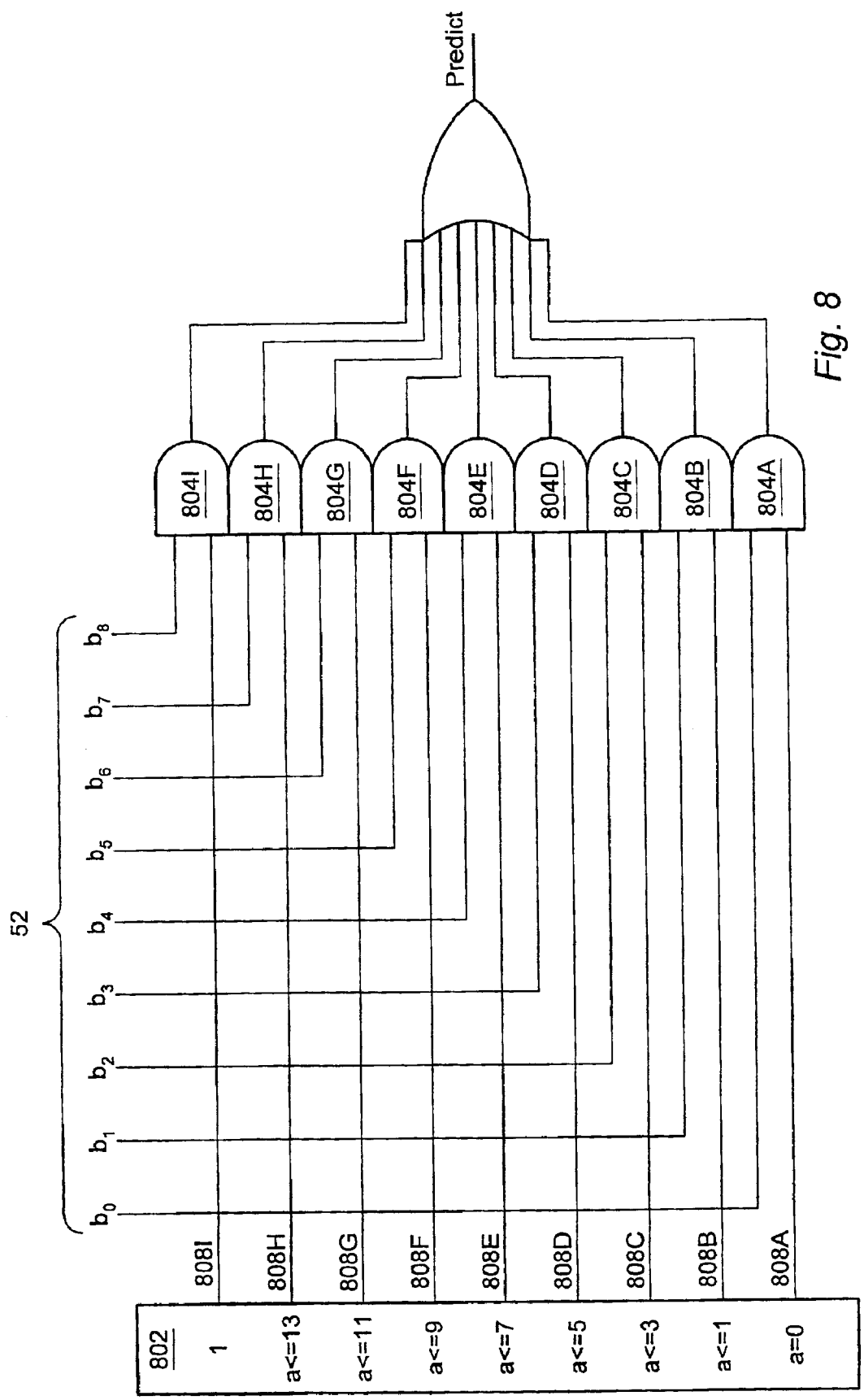
FIG. 8 is a diagram showing one embodiment of prediction logic.

FIG. 8 represents one embodiment of how branch marker bits 52 may be utilized to make a prediction. Included in FIG. 8 is circuitry 802 which compares a received fetch address offset (represented by "a" in the figure) to the values 0, 1, 3, 5, 7, 9, 11, 13 and 15 which correspond to offset values 708 shown in FIG. 7. In each case where the received offset is less than or equal to the value being compared to, a signal 808 indicating this fact is conveyed to an AND gate 804. In addition, each of branch marker bits 52 are conveyed to AND gates 804 as well. Logical AND gates 808 are coupled to logical OR gate 806 whose output indicates whether a branch prediction is being made. Referring to the example of FIG. 8, assume as before a fetch address is received with an offset equal to the value 3. As indicated in FIG. 7 the instruction with offset 3 corresponds to predicted taken branch PB0. Subsequently, corresponding branch marker bits 52 are conveyed from local predictor storage 206 to the logic depicted in FIG. 8. Circuitry 802 receives the offset with value 3 and asserts signals 808C–808I which are received by gates 804C–804I, respectively. In addition, branch marker bits 2, 6 and 7 convey a binary value of "1" to gates 804C, 804G and 804H, respectively. The remaining branch marker bits convey a binary value of "0". Consequently, each of gates 804C, 804G and 804H convey a binary value of "1" to gate 806, which in turn conveys a binary value of "1" indicating a branch prediction is being made.

Figure 9:
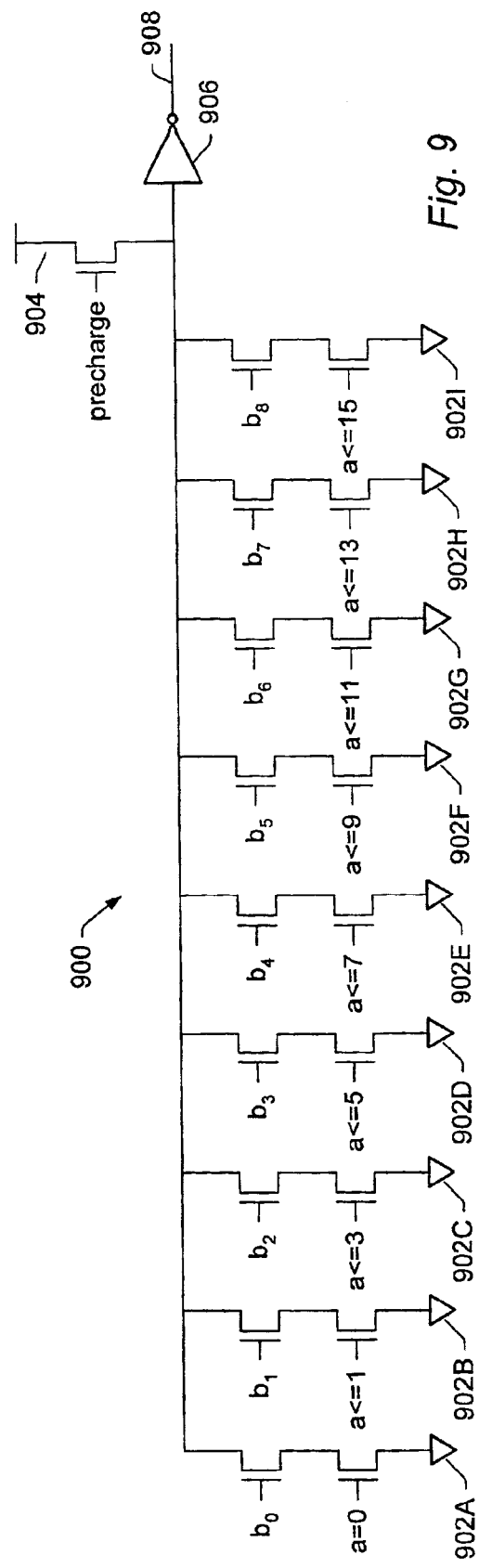
FIG. 9 is a diagram showing a dynamic logic corollary to the prediction logic shown in FIG. 8.

FIG. 9 illustrates one embodiment 900 of the circuitry depicted in FIG. 8 using dynamic logic. Those skilled in the art will readily understand the operation of dynamic logic. FIG. 9 includes coupled transistors 902A–902I which may be seen to correspond to logical AND gates 804A–804I, respectively. Also included is transistor 904 which may supply a precharged value for the dynamic logic, and an inverter 906. Initially, the output 908 of inverter 906 conveys a binary state of "0" during an evaluation phase of the circuit indicating no branch prediction is being made. However, in the event one or more of gates 902 has both inputs asserted, the output 908 of inverter 906 transitions to a binary value of "1" indicating a branch prediction is being made. Those skilled in the art will readily ascertain that there are many ways in which the logic of FIGS. 9 and 10 may be implemented to accomplish the same task.

Branch Marker Bit Update

Branch instructions generally include at least an opcode (identifying the branch instruction within the instruction set employed by microprocessor 10) and a displacement to be added to the address of the branch instruction (or the address of the instruction immediately following the branch instruction) to form the branch target address. Therefore, a branch instruction typically occupies at least two bytes. By taking advantage of this fact, a branch marker bit need not be stored for every instruction byte and the number of branch marker bits stored with respect to a group of contiguous instruction bytes may be reduced. However, a particular case of note exists involving the single byte RET instruction in which a branch marker is set to indicate a predicted taken branch, but the branch prediction may be missed. Embodiments for handling this particular case will be discussed.

Figure 10:
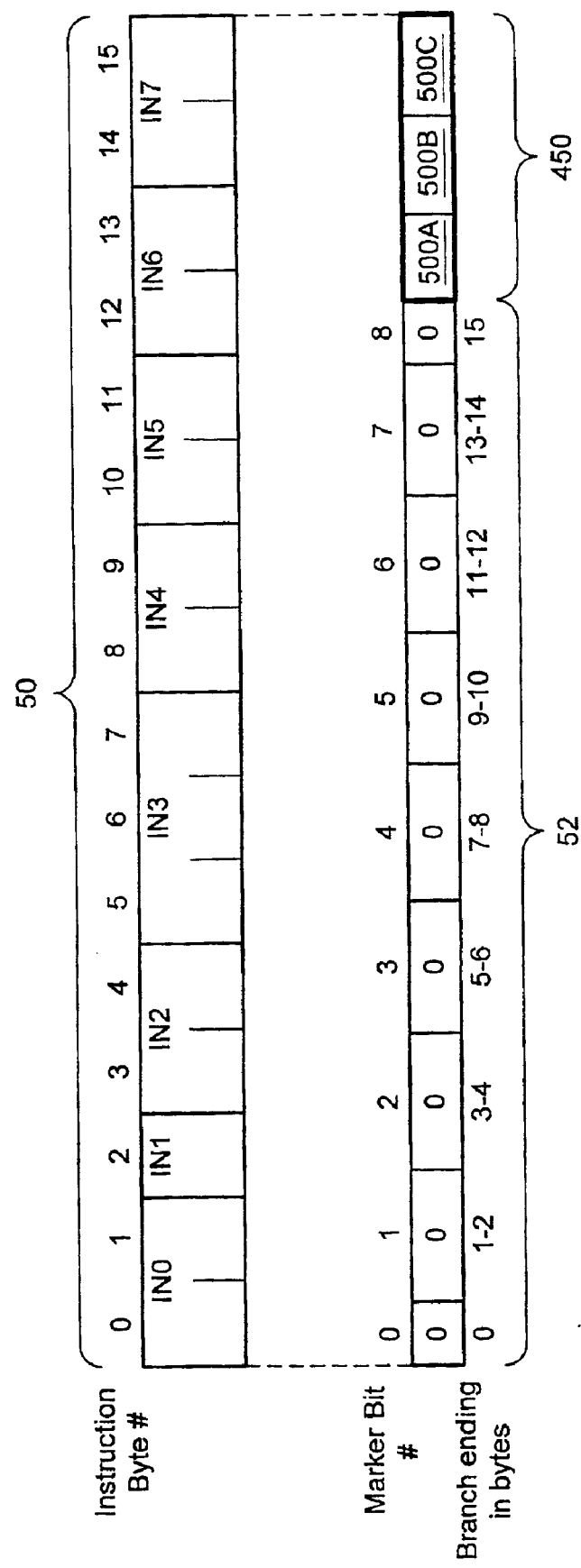
FIG. 10 is a diagram illustrating branch marker bit utilization.
Figure 11:
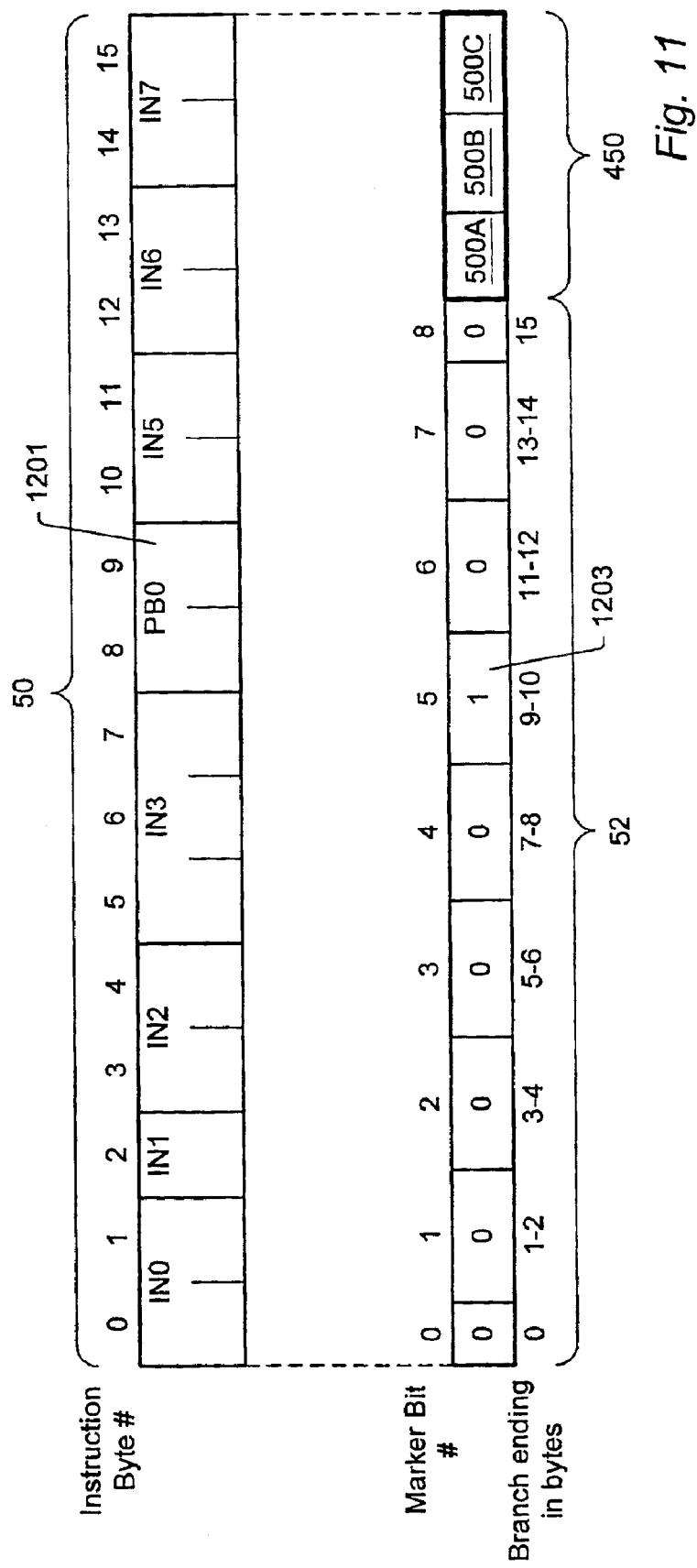
FIG. 11 is a diagram illustrating branch marker bit utilization.

FIGS. 11–15 provide examples of updating branch marker bits. FIG. 10 shows a group of contiguous instruction bytes 50, branch marker bits 52, and branch information 450. In the example of FIG. 10, no taken branches are predicted and no branch marker bits 52 are set. Turning now to FIG. 11, instruction bytes 50, marker bits 52, and branch information 450 are shown subsequent to detecting a predicted taken branch and a corresponding update of branch marker bits 52. FIG. 11 shows a predicted taken branch PB0 1201 is detected in instruction bytes 50 at instruction bytes #8 and

9. Because the predicted taken branch ends in instruction byte #9, branch marker bits 52 are updated by setting branch marker bit #5 1203 to a binary value of "1". In addition, in one embodiment, each of branch information entries 500A–500C may correspond to a first, second, and third predicted taken branch, respectively, appearing in instruction bytes 50. In such an embodiment, predicted taken branch PB0 1201 may be detected to be the first predicted taken branch appearing within the group of instruction bytes 50. Consequently, information corresponding to branch instruction PB0 1201 may be stored in branch information entry 500A.

Figure 12:
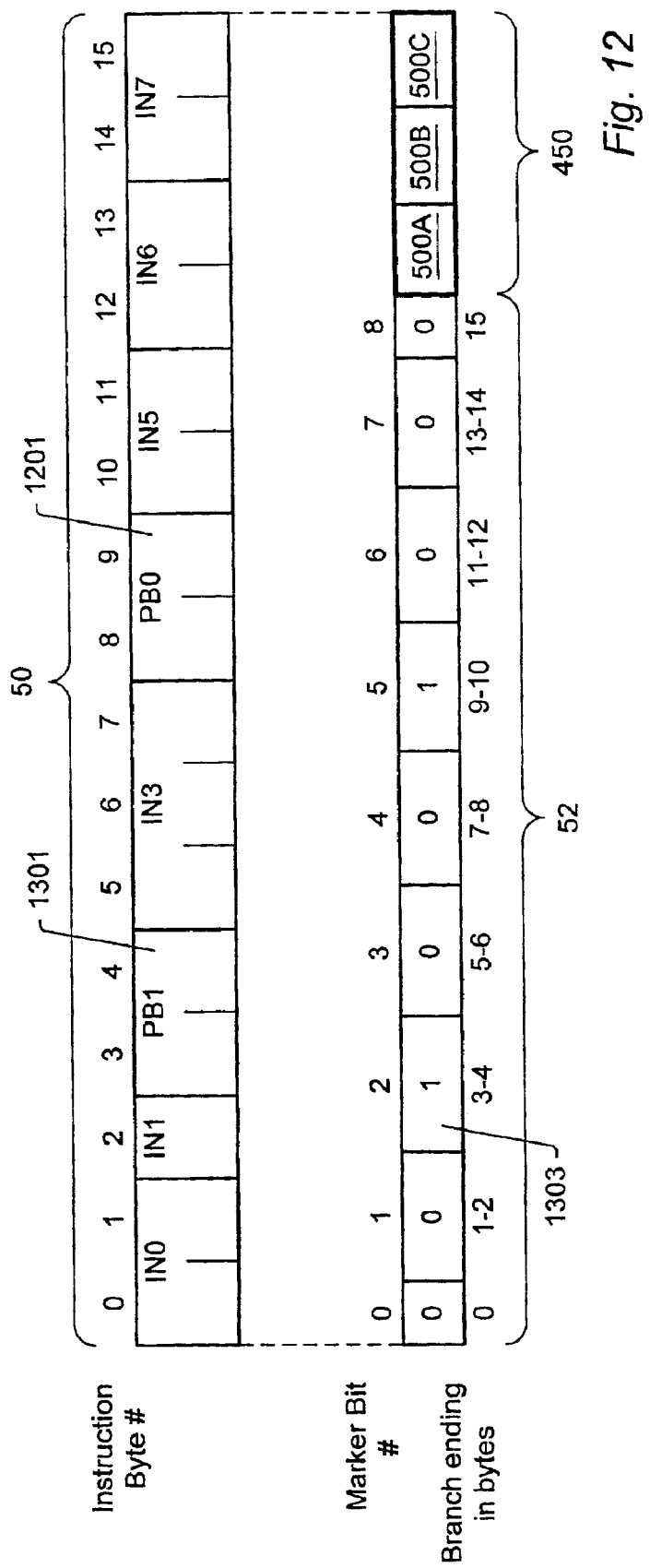
FIG. 12 is a diagram illustrating branch marker bit utilization.

FIG. 12 illustrates updating of branch marker bits 52 in response to detecting a second predicted taken branch. Predicted taken branch PB1 1301 is detected within group 50. In response to detecting branch PB1 1301 and because branch PB1 1301 ends in instruction byte #3, branch marker bit #2 1303 is set to a binary value of "1". Further, in the embodiment shown, newly detected branch PB1 1301 is determined to be the first predicted taken branch within group 50. Consequently, branch information corresponding to branch PB1 1301 corresponds to branch information entry 500A. However, branch information entry 500A currently contains branch information corresponding to branch PB0 1201 as described in the discussion of FIG. 11. Consequently, the data within entry 500A is shifted to entry 500B, and the new branch information corresponding to branch PB1 1301 is stored in entry 500A.

Figure 13:
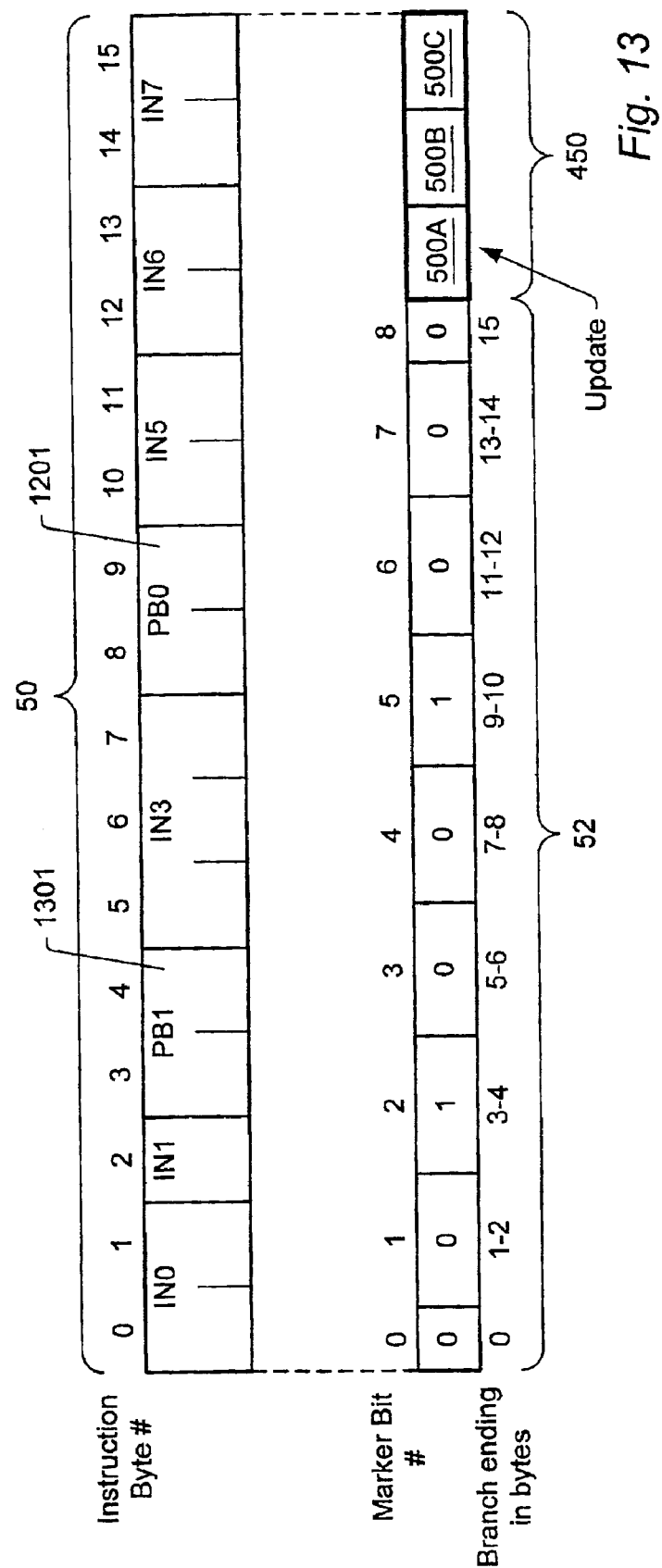
FIG. 13 is a diagram illustrating branch marker bit utilization.

FIG. 13 illustrates the update of a predicted taken branch entry. In the example of FIG. 13, a prediction of not taken is subsequently determined for branch PB1 1301. In order to update the taken prediction for PB1 1301, the corresponding dynamic bit 500A is set to a binary value of "1". Therefore, branch predictions corresponding to branches PB0 and PB 1 are present. However, branch PB1 is classified as dynamic 500A and branch PB0 remains classified as local 500B.

In the discussion above, each of branch information entries 500A–500C are described as corresponding to a particular predicted taken branch within group 50. For example, entry 500A corresponds to a first predicted taken branch appearing within group 50, entry 500B corresponds to a second, and entry 500C corresponds to a third. Consequently, to maintain this correspondence subsequent to updates, data within entries 500A–500C may be shifted. In general, when a new entry is created, data entries corresponding to that entry and all others to the right of that entry are shifted to the right to make room for the new entry. For example, if a newly predicted taken branch is detected which corresponds to entry 500A and entry 500A already stores a valid entry, then the contents of entry 500A are shifted to entry 500B, the contents of entry 500B are shifted to entry 500C, and the contents of entry 500C are shifted out of branch information 450 and lost. In one embodiment, target addresses in target array 208 may be similarly shifted to maintain a correspondence between predicted taken branches in group 50, branch information in entries 500, and targets in target array 208. While the above embodiment describes maintaining a correspondence by shifting data between entries, other embodiments are possible and are contemplated. For example, rather than moving data between entries, bits stored within an entry 500 and an entry in target array 208 may relate entries to a particular branch.

Figure 14:
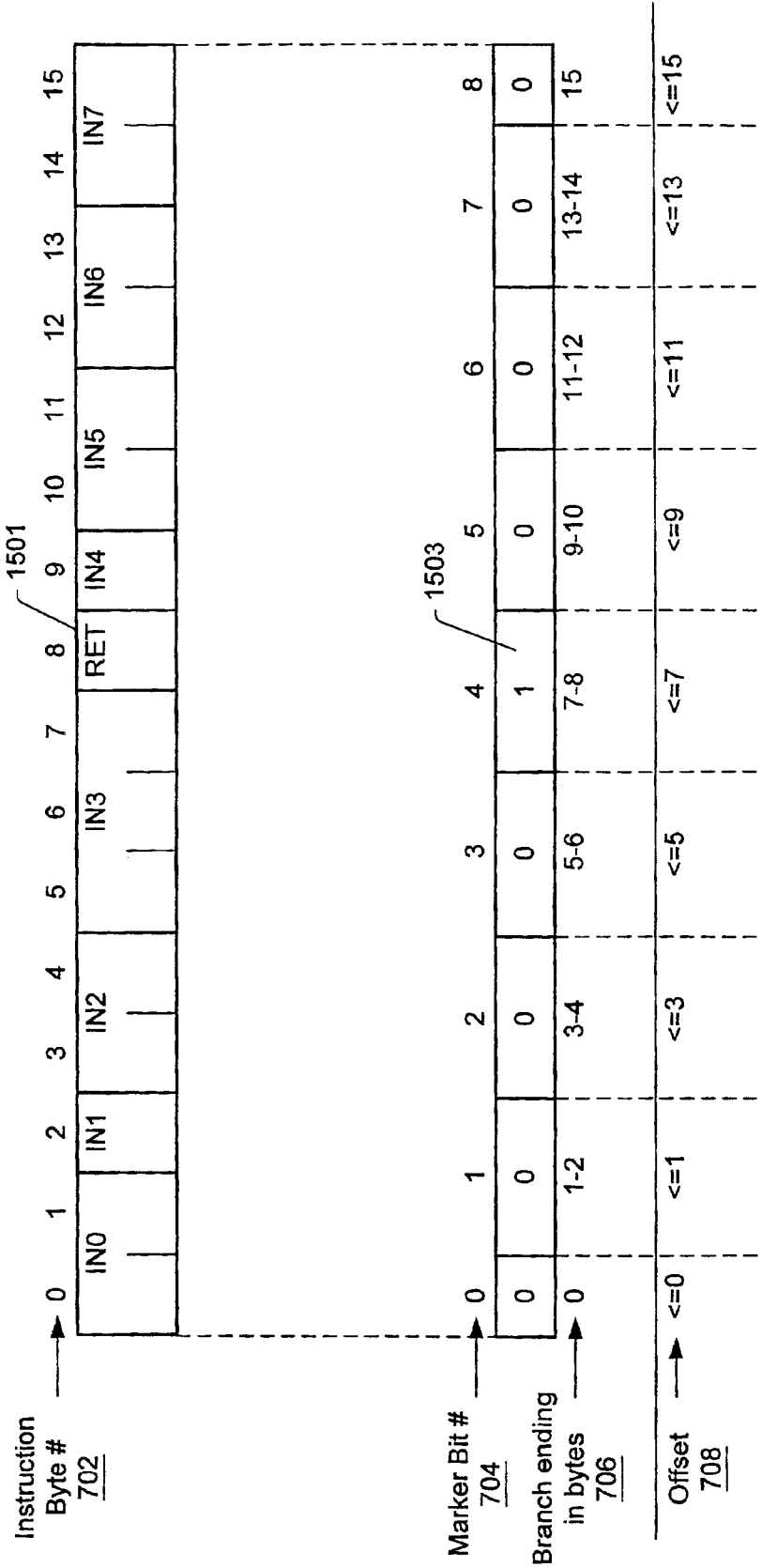
FIG. 14 is a diagram illustrating a missed prediction.

As mentioned above, a special case exists for a single byte branch instruction. FIG. 14 illustrates an example where such a prediction for a single byte branch instruction may be missed. FIG. 14 shows a contiguous group of instruction bytes which includes a single byte RET instruction 1501 in byte position 8. Branch marker bit #4 1503 is set to indicate a predicted taken branch, RET instruction 1501, ends in the instruction byte range 7–8. No other predicted taken branches are indicated. Now assume an example where a fetch address is received with an offset of 8 indicating the RET instruction 1501. Branch marker bit #4 indicates we wish to make a branch prediction for this instruction. However, when the branch marker bits are conveyed for the purpose of making a prediction, corresponding branch marker bit #4 does not meet the requirements of that marker bit position for consideration (i.e., an offset with a value equal to 8 is not <=7) and branch marker bit #4 will be effectively ignored. As illustrated by the logic in FIG. 8, branch marker bit #4, $b_4$, is set and will be conveyed to gate 804E. However, signal 808E which is also coupled to gate 808E will not be set because its condition, offset <=7, does not evaluate to true. Consequently, no branch prediction will be indicated by the logic in FIG. 8. In general, this missed prediction scenario may occur whenever the single byte RET instruction appears in any of instruction byte positions 2, 4, 6, 8, 10, 12, or 14. Various embodiments and mechanisms for handling this special case will be discussed below.

Branch Instruction Information

Figure 15:
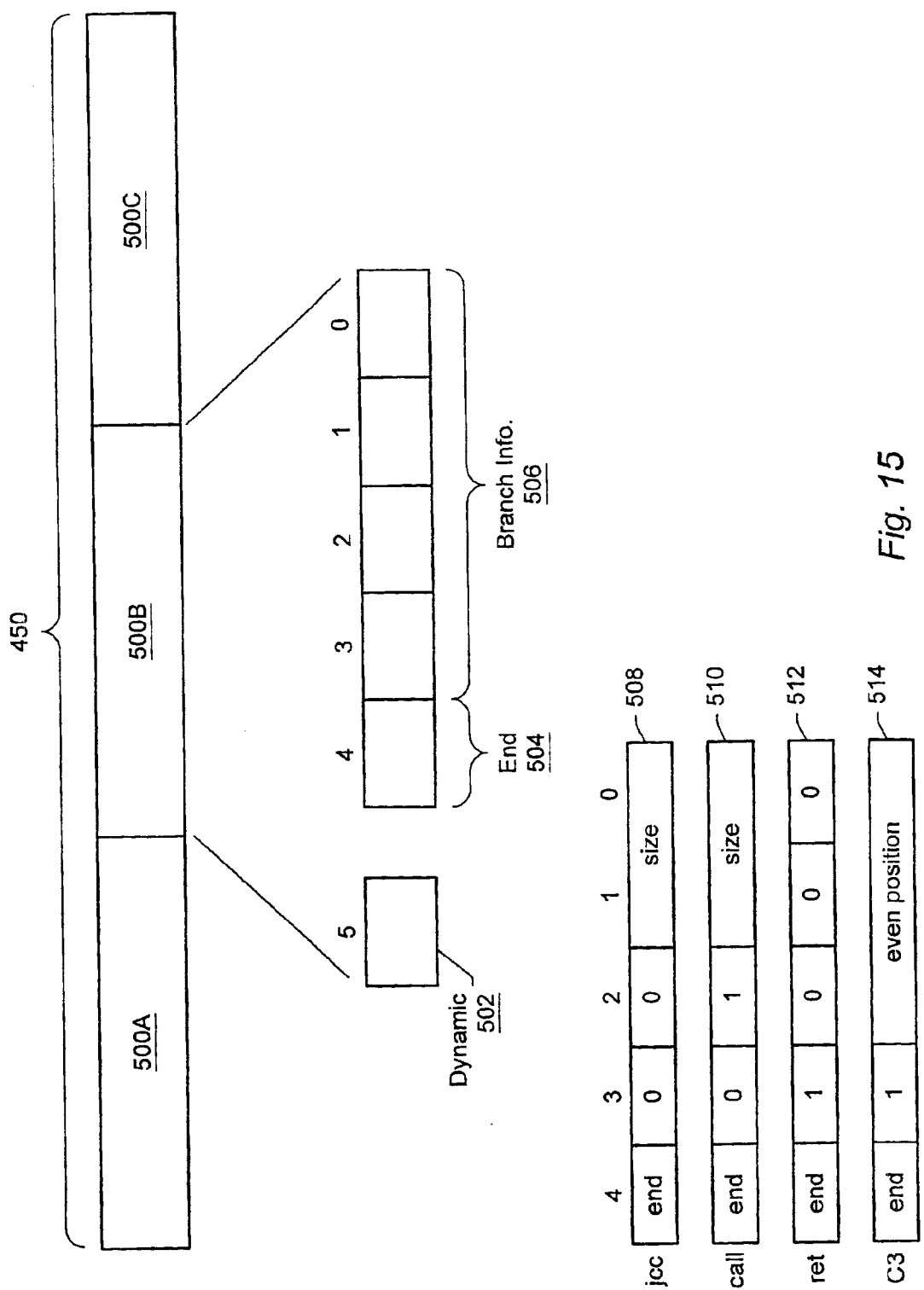
FIG. 15 is a diagram illustrating branch target information.

Turning now to FIG. 15, one embodiment of branch prediction information 450 is shown. As discussed above, each group of contiguous instruction bytes 50 has a corresponding set of branch marker bits 52 and branch prediction information 450 stored in local predictor storage 206. In the embodiment shown, branch prediction information 450 includes information for three branch instructions, 500A–500C. Included in each of 500A–500C are six bits providing information corresponding to a predicted taken branch. As shown in FIG. 15, the branch prediction information includes a dynamic bit 502, an end adjustment bit 504, and four bits 506 serving to classify the type and size of branch instruction. Dynamic bit 502 may be utilized to indicate a global branch prediction from global predictor 205 is to be used, rather than a local branch prediction from local predictor 206. End adjustment bit 504 may be used to indicate whether the corresponding branch instruction ends on an even or odd byte. Finally, branch information 506 may be used to classify the type and size of a branch instruction.

Also shown in FIG. 15 are four exemplary encodings of branch information 506. As indicated, each branch instruction includes an end bit 504 (bit position 4 in the example). A first encoding 508 may be used to indicate a conditional or unconditional branch instruction by setting the third and second bits to "0" and "0", respectively. A second encoding 510 may be used to indicate a call instruction by setting the third and second bits to "0" and "1", respectively. A third encoding 512 may be used to indicate a return type instruction by setting bits three through zero to "1000". Finally, a fourth encoding (514) may be used to indicate a one byte return opcode ending on an even byte by setting bit three to "1" and bits two to zero to a value other than "000". Each of the first two encodings 508–510 also include a field (bits one and zero) for indicating a size of any immediate or displacement data for the instruction. In one embodiment, one, two, or four bytes of data may be indicated by encoding bits one and zero as "00", "01", and "10", respectively. Finally, the fourth encoding 514 depicted in FIG. 15 includes a field (bits two through zero) for indicating which non-zero, even instruction byte within the group 50 that the single byte return instruction appears. In the above described embodiment, the position field in encoding four 514 may assume one of seven values, "001"–"111", which may correspond to byte positions 2, 4, 6, 8, 10, 12 and 14, respectively. Usage of the branch information described above will be illustrated in the discussions below.

Prediction Logic

Figure 16:
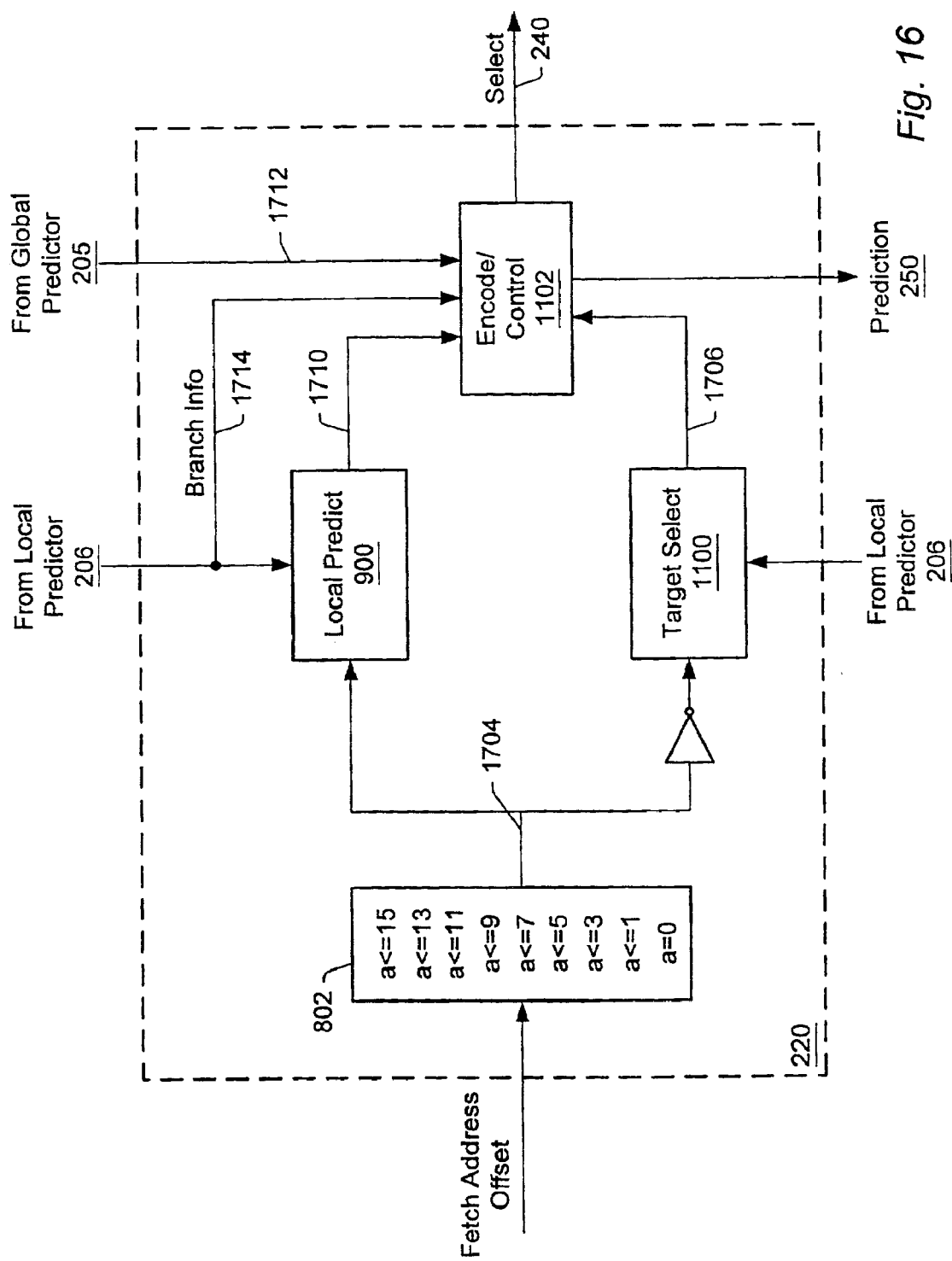
FIG. 16 is a block diagram showing one embodiment of a prediction logic unit.

Turning now to FIG. 16, one embodiment of prediction logic 220 is shown. Included in FIG. 16 are comparison circuitry 802, local prediction circuit 900, target select circuit 100, and control circuit 1102. Comparison circuit 802 is coupled to receive a fetch address offset and is further coupled to convey signals 1704 to predict circuit 900 and target select circuit 100. Target select circuit 100 and predict circuit 900 are coupled to receive branch prediction entry information from local predictor 206. Control circuit 1102 is coupled to predict circuit 900, target select circuit 1100, local predictor 206, and global predictor 205. Generally, comparison circuit 802 receives a fetch address as described above, and conveys signals 1704 to circuits 900 and 1100. Predict circuit 900 is configured to determine whether a branch prediction is made based on branch marker bits received from local predictor 206 and signals from circuit 802, and conveys the resulting prediction 1710 to control circuit 1102. Target select circuit 1100 also utilizes branch marker bits received from local predictor 206 and conveys an indication 1706 to control circuit 1102 as to which branch target is to be used in the event of a taken prediction. Control circuit also receives branch target information 1714 and conveys a signal 240 to multiplexor 202 selecting a fetch address. In addition, in one embodiment, circuit 1102 also conveys a branch prediction 250 to branch address calculator 270. Also, while the described embodiment includes a global predictor mechanism which may provide an alternate prediction for a particular branch, the mechanism may be utilized without a global predictor mechanism.

The target select circuit 1100 shown in FIG. 16 may generally be configured to select one target from among a number of targets for use in the branch prediction. In one embodiment, target select circuit 1100 may determine a number of branch marker bits which are set for instruction bytes corresponding to offsets which are prior to the offset of the received fetch address. Based on this information, a first, second or third branch target may be selected (for an embodiment including three branch targets). For example, assume three possible branch targets are available and an offset equal to 6 has been received. Circuit 100 may determine the number of branch marker bits which are set among the range of branch marker bits occurring prior to branch marker bit 6 (i.e., branch marker bits 0–5). If no branch marker bits are set in the range, then the branch is identified as the first predicted taken branch and the first target is selected. If only one branch marker bit is set in the range, then the branch is identified as the second predicted taken branch instruction and target two is selected. If two branch marker bits are set, then target three is selected.

Figure 17:
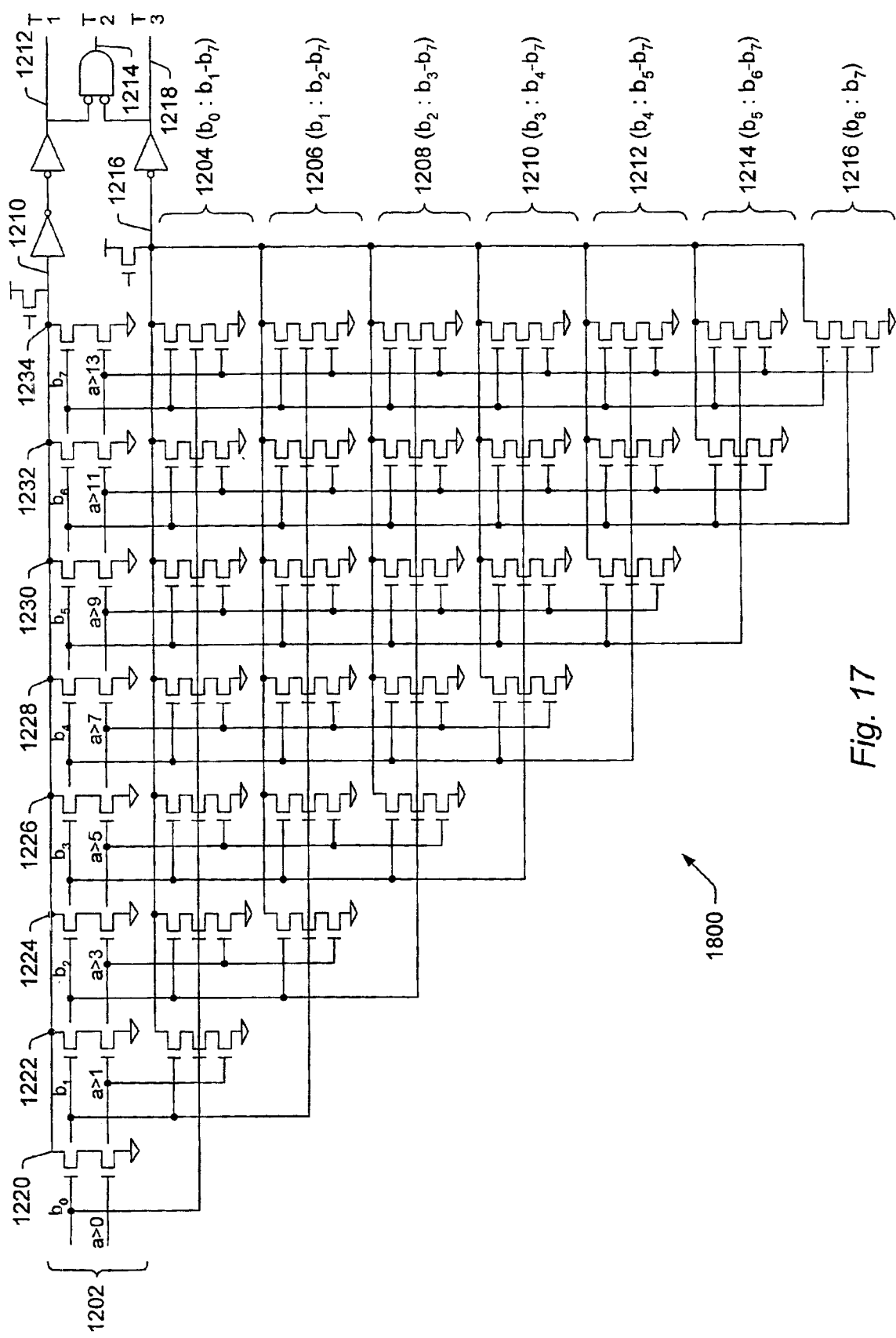
FIG. 17 is a diagram illustrating one embodiment of a target select circuit.

While there are many possible ways of implementing target select circuit 1100, FIG. 17 illustrates one exemplary embodiment 1800 utilizing dynamic logic. In the embodiment of FIG. 17, rows 1202–1216 and columns 1220–1234 of transistors are organized in such a way that a target may be selected based on received branch marker bits and an offset address. In circuit 1800, three target selections are possible, T1 1212, T2 1214, and T3 1218. In general, circuitry 1800 utilizes received branch marker bits and signals received from comparison circuit 802 to eliminate particular targets from consideration as they are detected. For example, if a single branch marker is detected to occur prior to the fetch address offset, then target one is eliminated from consideration and target two is selected. If two set branch marker bits are detected which occur prior to the fetch address offset, then target three is selected. While those skilled in the art may readily determine the operation of circuit 1800, a brief explanation follows.

The first row 1202 depicted in FIG. 17 consists of pairs of transistors 1220–1234 which act to determine if there are any branch marker bits set which occur prior to the received offset. By default, target T1 1212 evaluates to true, or binary "1". The value of T1 1212 also serves as an inverted input to a logic AND gate providing a value for T2 1214. Consequently, when T1 1212 equals a binary "1", T2 evaluates to a binary "0". Each pair of transistors in row 1202 receives a branch marker bit and a signal from comparison circuit 802 corresponding to the fetch address offset. For example, the pair of transistors at column 1220 and row 1202 receives a first input corresponding to branch marker bit 0, $b_0$, and a second input which indicates whether the received offset address is greater than 0 (i.e., a>0, where the received offset address is represented by "a"). In the event both inputs evaluate to binary "1", target T1 1212 will evaluate to binary "0", indicating there is a predicted taken branch prior to the received fetch address and target T1 1212 is eliminated from consideration as the predicted target. The remaining rows 1204–1216 are configured to determine whether there are two branch marker bits set prior to the current offset which would eliminate target T2 1214 from consideration. Row 1204 compares branch marker bit $b_0$ with each of branch marker bits $b_1$–$b_7$. Row 1206 compares branch marker bit $b_1$, with branch marker bits $b_2$–$b_7$, and so on. In the event two branch marker bits are detected to occur prior to the current offset, target T3 1218 evaluates to "1", and target T2 1214 evaluates to "0". However, if two prior branch marker bits are not detected to be set by rows 1204–1216, then target T2 1214 evaluates to binary "1". As already mentioned, circuitry 1800 is intended to be exemplary only. Numerous methods for selecting a corresponding target are possible and are contemplated.

Figure 18:
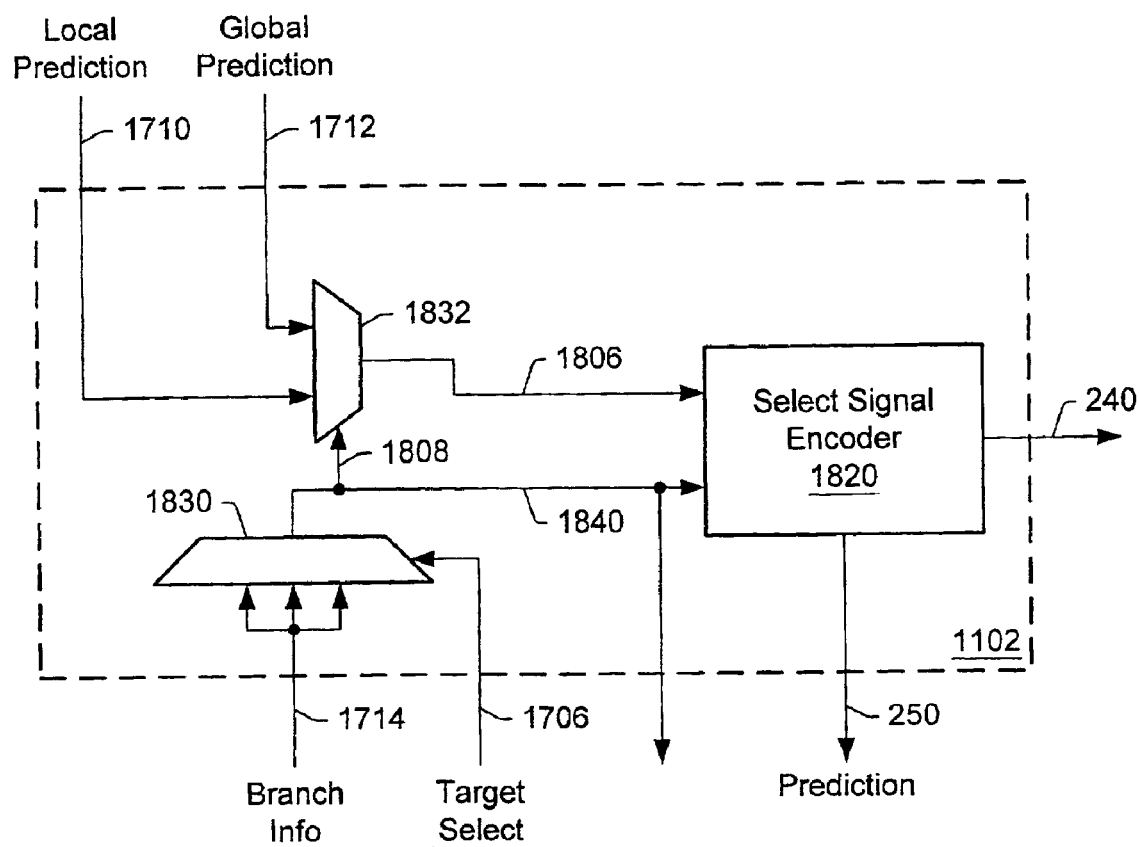
FIG. 18 is a block diagram illustrating one embodiment of a select signal circuit.

Turning now to FIG. 18, one embodiment of control circuit 1102 is illustrated. Included in FIG. 18 are encoder circuitry 1820, and multiplexors 1832 and 1830. Multiplexor 1832 is coupled to receive a local prediction 1710 from predictor circuit 900 and a global prediction 1712 from global predictor 205. Multiplexor 1830 is coupled to receive branch information 1714 corresponding to three branch instructions from local predictor 206. In addition, multiplexor 1830 is coupled to receive target select signal 1706 from target select circuit 1100. Select signal 1706 selects branch information 1840 for conveyance from multiplexor 1830 to encoder circuitry 1820. In addition, in the embodiment shown a dynamic bit 1808 contained within branch information 1840 is used to select either a local 1710 or global 1712 prediction 1806 for conveyance from multiplexor 1832 to encoder circuitry 1820. Utilizing the branch information 1840 and prediction 1806, encoding circuitry 1820 may determine if a branch is predicted taken or not. In the event no branch is predicted taken, encoder circuitry 1820 may be configured to encode select signal 240 to convey a sequential address 232 from multiplexor 212. Alternatively, encoder circuitry 1820 may encode signal 240 to select a return address 230 or a branch target address received from target array 208. In the embodiment shown, dynamic bit 1808 may be used to select either a local prediction 1710 or a global prediction 1712. In one embodiment, when a branch exhibits behavior which is relatively unpredictable, a global branch prediction history may be utilized to improve the accuracy of predictions for that branch. In such a case, the dynamic bit may be set to indicate a global branch prediction is to be utilized rather than a local branch prediction.

Branch Address Calculation

Figure 19:
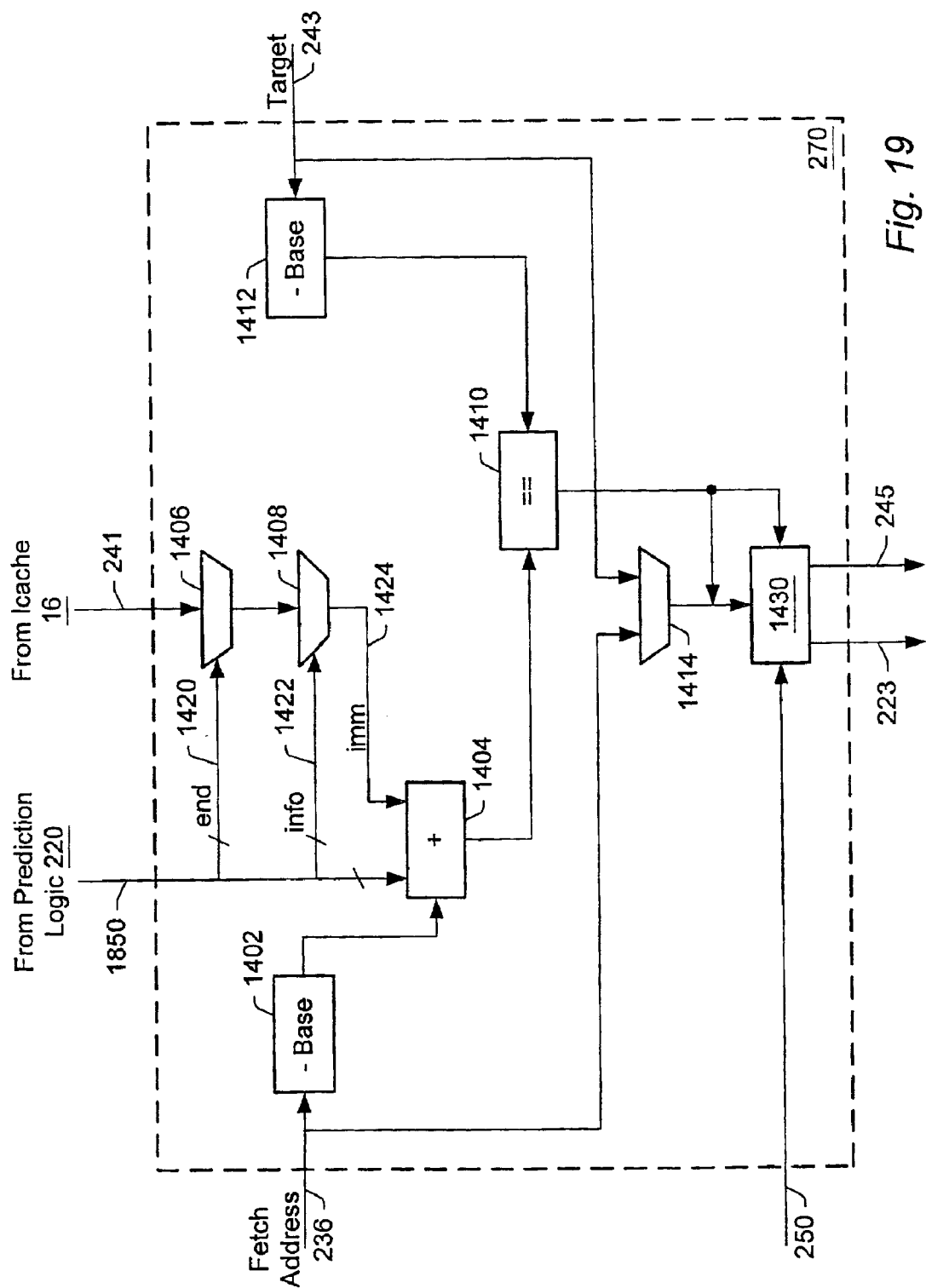
FIG. 19 is a diagram illustrating one embodiment of a branch address calculation unit.

As previously mentioned, in one embodiment a fetch address 243 selected by signal 240 to be conveyed by multiplexor 212 may provide the final branch prediction conveyed for a given fetch address by branch prediction unit 16. However, in an alternative embodiment, branch prediction unit 14 is configured to perform a branch address calculation in order to detect a misprediction at an early stage. FIG. 19 is a block diagram of branch address calculator 270. In the embodiment shown, branch address calculator 270 is configured to receive an address 236 from multiplexor 222, prediction information 242 from local predictor 206, a group of instruction bytes 241 from instruction cache 16, and a target address 243 from multiplexor 212. Branch address calculator 270 is also configured to convey a fetch address 245.

In general, branch address calculator 270 is configured to calculate a relative branch target address based on a received fetch address 236 and branch instruction immediate data 241. The newly calculated target address is then compared to the predicted target address 243. If the newly calculated target address does not equal the predicted target address 243, a mis-prediction is detected and the newly calculated target is conveyed as a next fetch address 245. Advantageously, branch mispredictions may be detected earlier and a new fetch address calculated earlier.

In the embodiment shown in FIG. 19, information corresponding to a predicted branch instruction is conveyed from local predictor 206 via bus 1850. In one embodiment, branch information 1850 includes an offset address of the corresponding branch instruction within a group of instruction bytes. In addition, a group of instruction bytes 241 is conveyed to multiplexor 1406 from instruction cache 16. Utilizing the received offset and end bit 504 information included in branch information 1850, a select signal 1420 may be conveyed to multiplexor 1406 and the corresponding branch instruction may be conveyed from multiplexor 1406 to multiplexor 1408. Further, utilizing the received branch information 506 included in the received information 1850, a signal 1422 may be conveyed to multiplexor 1408 which selects and conveys immediate data 1424 corresponding to the predicted branch instruction. Fetch address 236 is conveyed to multiplexor 1414 and circuit 1402 which is configured to subtract a base address from the fetch address 236. In one embodiment, the base address base corresponds to the address specified by the corresponding segment portion of the x86 address translation mechanism. Subsequent to subtracting the base, circuit 1402 conveys the resulting address to circuit 1404 which is configured to add the resulting address to the immediate data 1424 received from multiplexor 1408 and convey the result 1413 to circuit 1410.

In addition to the above, the predicted target 243 is conveyed to multiplexor 1414 and circuit 1412 which is configured to adjust the predicted fetch address by subtracting a base address and convey the resulting address 1415 to circuit 1410. Upon receiving the calculated address 1413 and adjusted fetch address 1415, circuit 1410 is configured to compare the two. In the event the two address do not compare equally, circuit 1410 is configured to select fetch address 236 for conveyance from multiplexor 1414. Circuit 1430 may be configured to convey the fetch address 236 in the event of a miscompare. In the event the calculated and adjusted fetch addresses compare equally, circuit 1430 may be configured to not convey a new fetch address. Further, circuit 1430 may be configured to not convey a new fetch address in response to detecting prediction signal 250 indicates a prediction of not taken.

In one embodiment, two fetch addresses may be determined and conveyed by branch prediction unit 14 in response to receiving a fetch address 236. A first fetch address conveyed from multiplexor 212 may be utilized immediately as a new fetch address for use in fetching instructions from instruction cache 16. Simultaneously, the fetch address conveyed from multiplexor 212 is conveyed to branch address calculator 270 to perform the above described comparison. In the event the fetch address conveyed via multiplexor 212 does not equal the fetch address calculated by branch address calculator 270 as described above, branch address calculator 270 conveys a second fetch address to be used in fetching instructions from the instruction cache 16.

Branch Prediction Victim Cache

Figure 20:
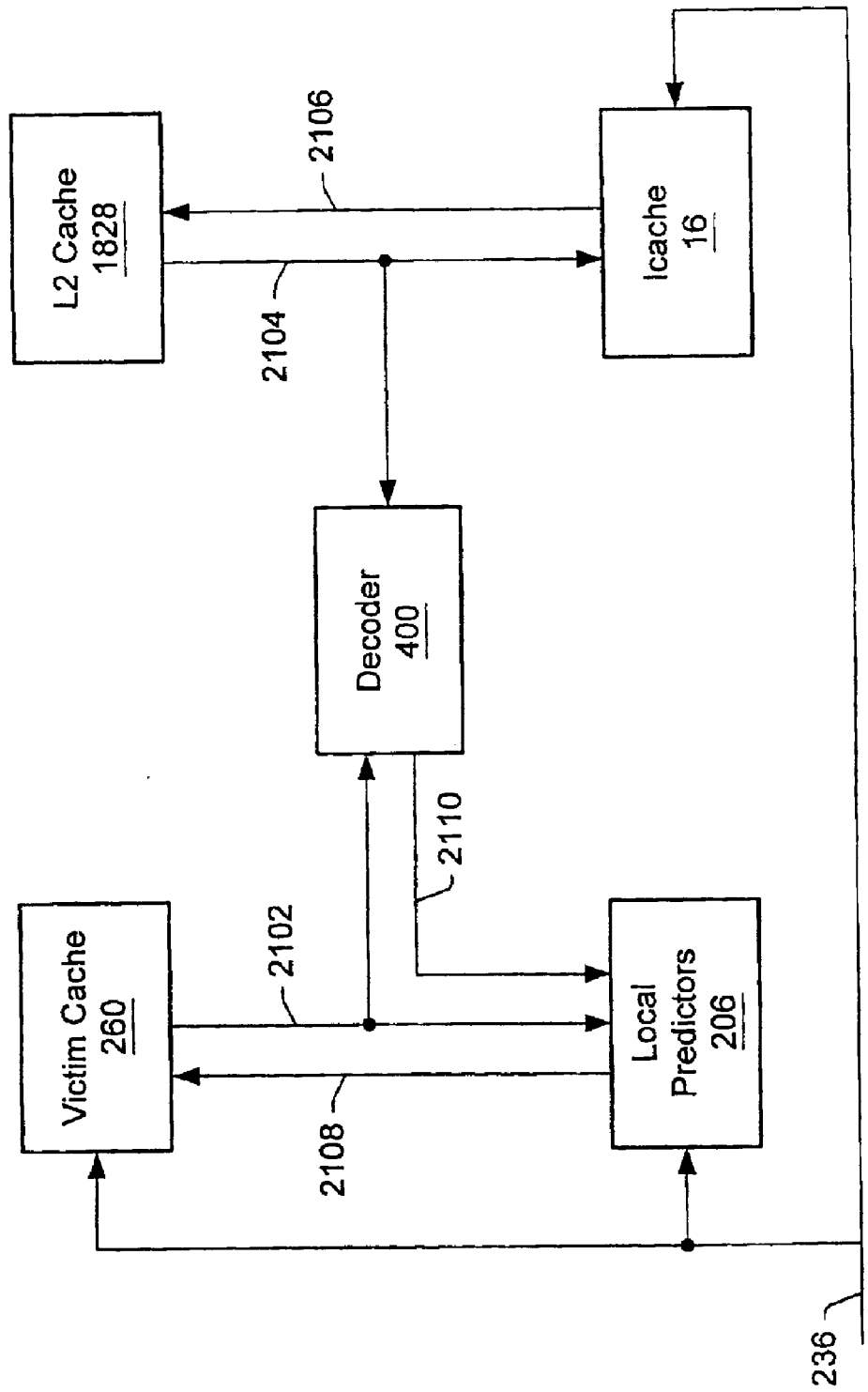
FIG. 20 is a block diagram illustrating a relationship between a level one branch prediction storage and a level two branch prediction storage.

As mentioned above, victim cache 260 may be utilized to store branch prediction information which has been evicted from local predictor storage 206. FIG. 20 is a block diagram illustrating one embodiment of the interaction between local predictor storage 206 and victim cache 260. In addition to local predictor storage 206 and victim cache 260, FIG. 20 shows Icache 16, L2 Cache 1828, and decoder 400. In the embodiment shown, victim cache 260 is configured to store branch prediction information evicted from local predictor storage 206 and L2 Cache 1828 is configured to store data including program instructions.

When an entry is evicted from local predictor storage 206, branch marker bits and dynamic bits corresponding to the evicted entry are conveyed to victim cache 260 via bus 2108 for storage within victim cache 260. Other branch prediction information corresponding to the evicted entry, such as end adjustment bits 504 and branch info 506 are discarded. Similarly, in the embodiment shown, data which is evicted from Icache 16 may be conveyed via bus 2106 for storage within L2 Cache 1828. Subsequently, upon presentation of a fetch address 236 to local predictor storage 206 and Icache 16, a determination is made as to whether a branch prediction entry corresponding to the presented fetch address is present within local predictor storage 206. In the event no corresponding entry is present within local predictor storage 260, victim cache 260 may be queried for a corresponding entry. Upon detecting a valid corresponding entry within victim cache 260, branch marker bits and dynamic bits are conveyed via bus 2102 to decoder 400 and local predictor storage 206. Local predictor storage is configured to store the received branch marker bits and dynamic bits in the corresponding entry. In addition, a group of instructions corresponding to the fetch address 236 are conveyed via bus 2104 to decoder 400 and Icache 16.

Utilizing the received instructions and branch marker bits, decoder 400 may then rebuild the remaining portion of the branch prediction entry for local predictor storage 206. Decoder may utilize the branch marker bits received via bus 2102 to determine the location of predicted taken branches within the group of instructions received via bus 2104. Further, decoder 400 may decode the identified predicted taken branches to determine their type (e.g., unconditional, conditional, etc.), whether the branch ends on an even or odd byte, and the size of any immediate data corresponding to the branch instruction. Based on this determination, decoder 400 may recreate the remaining portion of the corresponding branch prediction entry for local predictor storage 206. In the embodiment shown, the remaining portion of the branch prediction entry corresponds to branch information 506 and end adjustment bit 504. Advantageously, a full branch prediction entry in local predictor storage 206 is recreated without the need to re-execute the corresponding group of instructions. Further, only a portion of the branch prediction entry need be stored in victim cache 260. Consequently, victim cache 260 may be made smaller.

Figure 21:
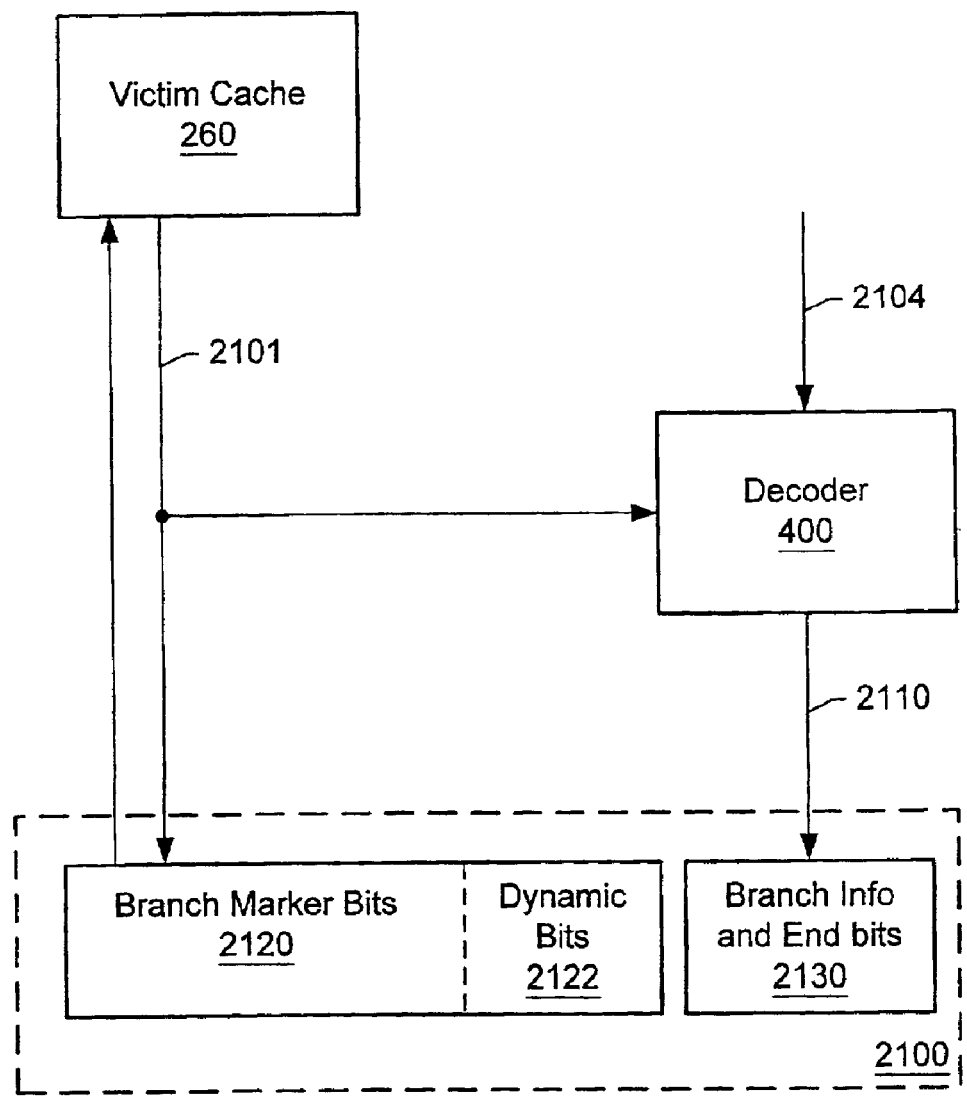
FIG. 21 is a block diagram illustrating a relationship between a level one branch prediction storage and a level two branch prediction storage.

FIG. 21 further illustrates the recreation of a branch prediction entry in local predictor storage 206. FIG. 21 includes victim cache 260, decoder 400, and an entry 2100 in local predictor storage 206. As illustrated, branch marker bits 2120 and dynamic bits 2122 comprise data which are evicted to victim cache via bus 2108 and retrieved from victim cache 260 via bus 2102. Branch information 2130 comprises data corresponding to branch information 506 and end adjustment bits 504. Branch information 2130 is discarded upon eviction of entry 2100 from local predictor storage 206. As described above, decoder 400 is configured to recreate branch information 2130 and convey the recreated data via 2110.

Figure 22:
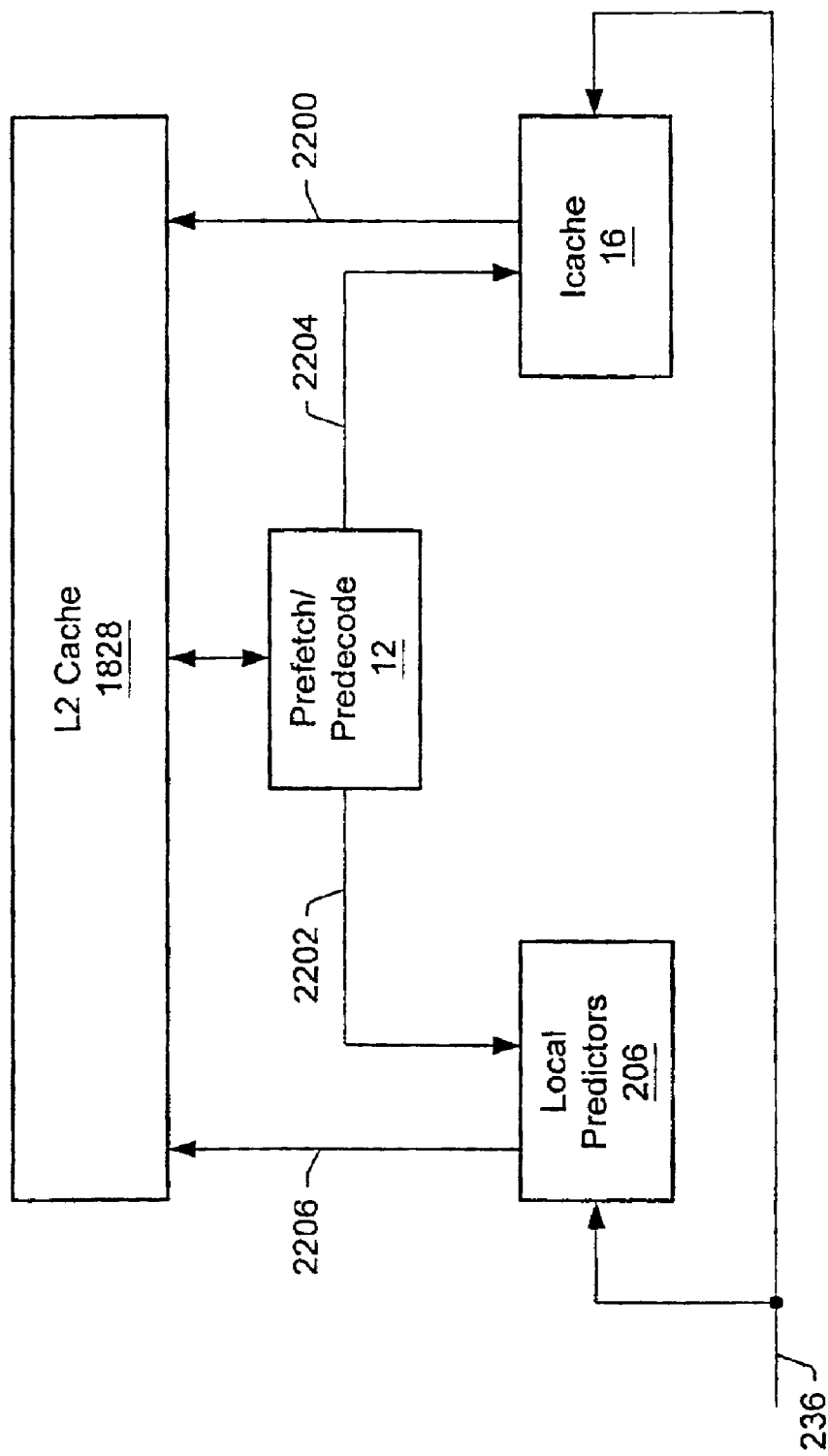
FIG. 22 is a block diagram illustrating a relationship between a level one branch prediction storage and a level two branch prediction storage.

As described above, fetch address 236 is presented to both local predictor storage 206 and Icache 16. However, in alternative embodiments, the fetch address 236 may also be presented to victim cache 260 and/or L2 Cache 1828 in parallel with its presentation to local predictor storage 206 and Icache 16. Further, in an alternative embodiment, L2 Cache 1828 may be configured to store data evicted from local predictor storage 206 as described above. FIG. 22 illustrates an embodiment wherein L2 Cache 1828 is configured to store program instructions and corresponding branch prediction information. In the embodiment shown, local predictor storage 206 is configured to convey evicted branch prediction information to L2 Cache 1828 via bus 2206. Icache 16 may be configured to convey evicted program instructions to L2 Cache 1828 via bus 220. Prefetch unit 12 is configured to fetch both program instructions and branch prediction information from L2 Cache 1828. Prefetch is further configured to recreate a full branch prediction entry based on branch information and program instructions fetched from L2 Cache 1828. The full branch prediction entry is then conveyed to local predictor storage 206 via bus 2202 and the corresponding fetched program instructions may be conveyed to Icache 16 via bus 2204.

Detecting Missed Predictions

Figure 23:
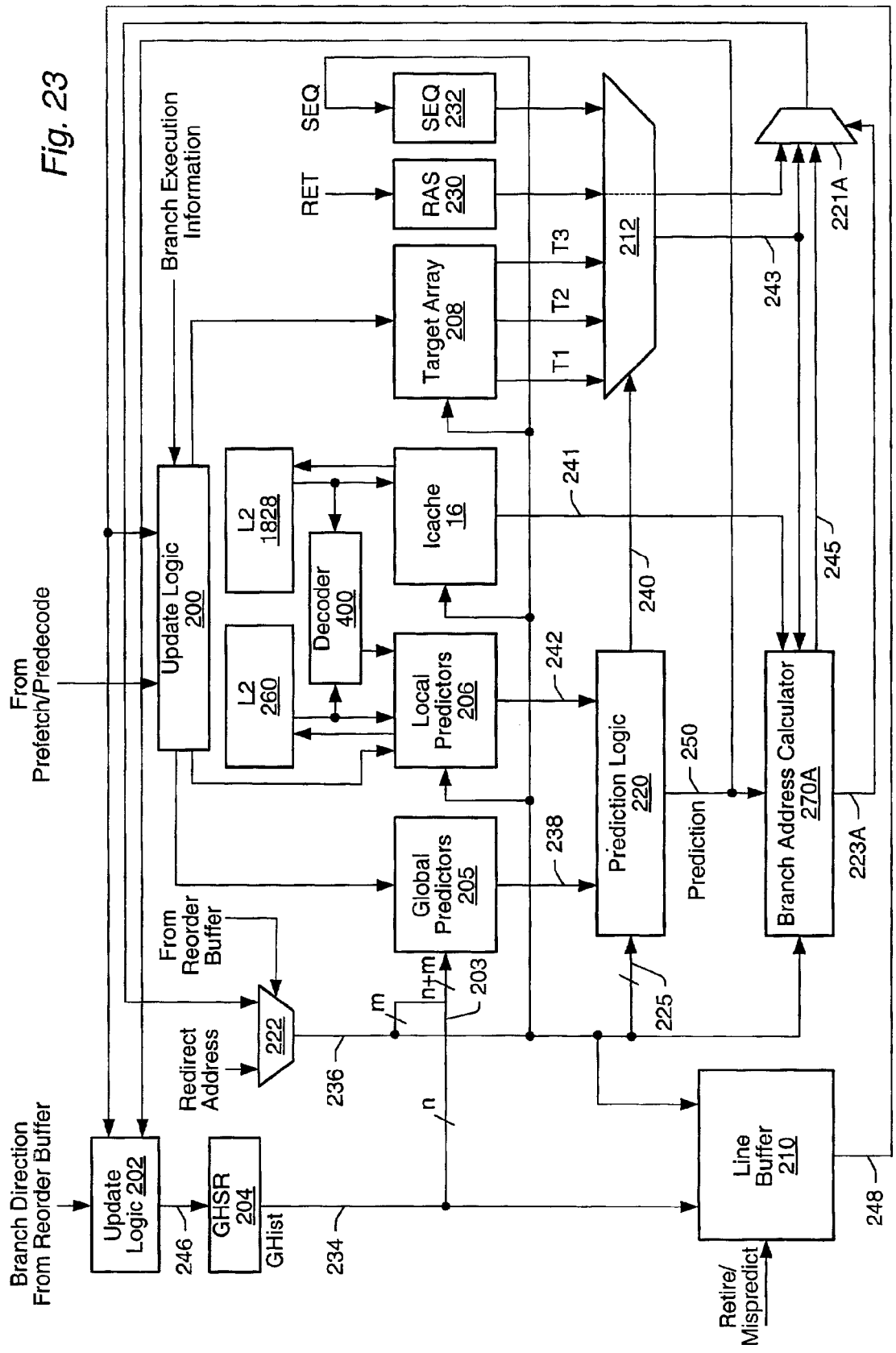
FIG. 23 is a block diagram of one embodiment of a branch prediction unit.

As previously mentioned, a special case exists involving a single byte RET instruction. As illustrated in FIG. 14, a single byte RET instruction occurring in particular positions which is predicted taken may be overlooked by prediction logic 220 and subsequently predicted not taken. The following discussion describes one embodiment of branch prediction unit 14 which is configured to detect such missed predictions. FIG. 23 is a block diagram showing one embodiment of branch prediction unit 14. The embodiment of FIG. 23 is similar to that of FIG. 2. However, in the embodiment of FIG. 23, return address stack 230 is coupled to multiplexor 221A, branch address calculator 270A is modified as compared to branch address calculator 270, and signal 223A is configured to select from one of the three inputs to multiplexor 221A. In general, the embodiment shown in FIG. 23 operates as before. However, branch address calculator 270A is configured to detect missed predictions corresponding to single byte RET instructions and select a fetch address from the return stack 230 in response.

Figure 24:
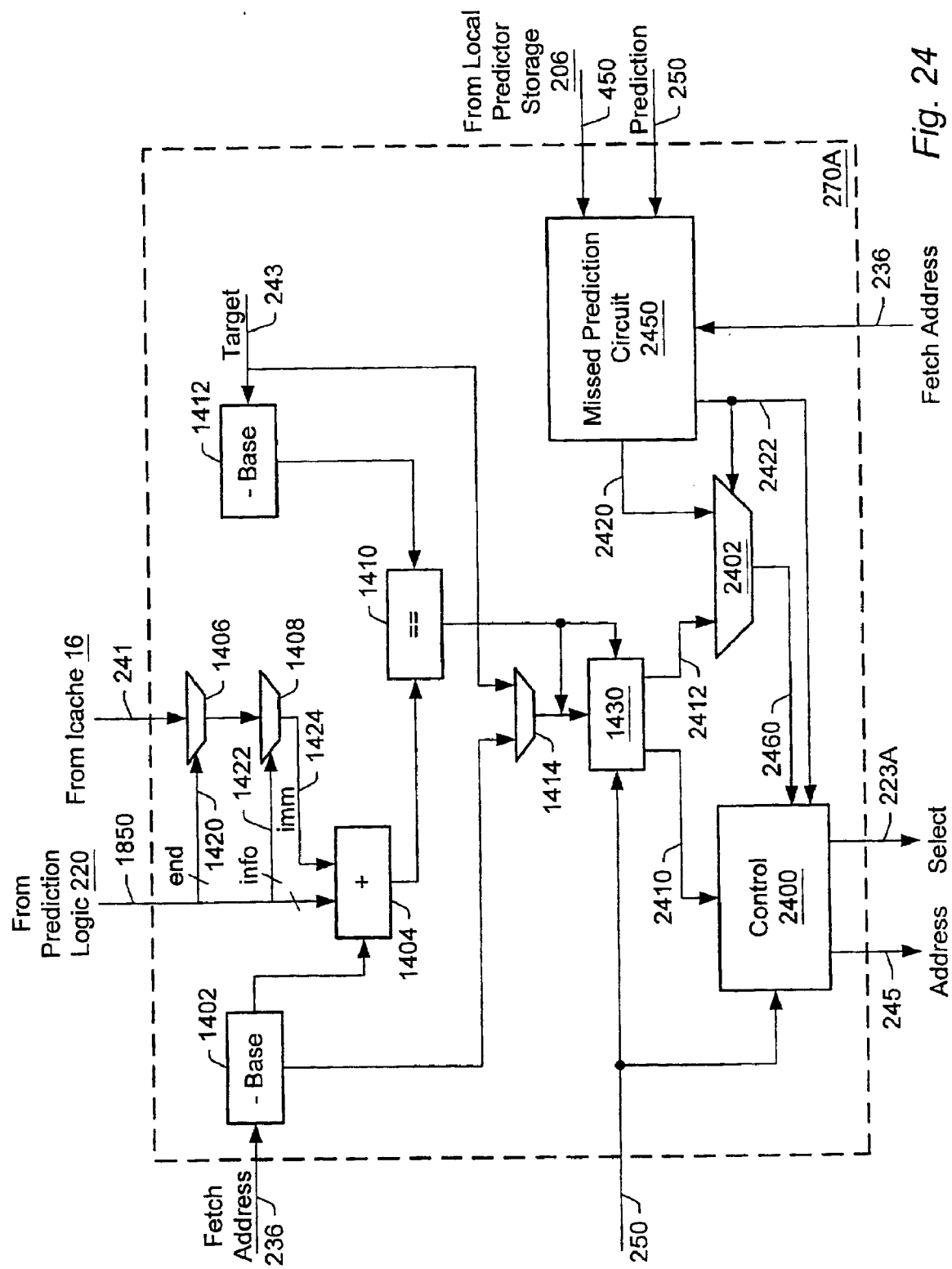
FIG. 24 is a diagram of one embodiment of a branch address calculation unit.

FIG. 24 shows one embodiment of branch address calculator 270A. Branch address calculator 270A is configured similar to that of branch address calculator 270 and may calculate a second fetch address for conveyance via bus 245 as described above. However, rather than conveying an address 245 and control signal 223 from circuit 1430 as in branch address calculator 270, circuit 1430 is configured to convey a potential second fetch address 2410 to control circuit 2400 and a corresponding select signal 2412 to multiplexor 2402. In addition, branch address calculator 270A includes missed prediction circuit 2450 which is configured to detect missed predictions corresponding to single byte RET instructions. Missed prediction circuit 2450 is coupled to receive branch target information 450 from local predictor storage 206, prediction 250 from prediction logic 220, and fetch address 236. Further, circuit 2450 is coupled to convey select signals 2420 and 2422 to multiplexor 2402. Signal 2422 is further coupled to control circuit 2400.

In response to detecting a missed prediction, missed prediction circuit 2450 conveys select signal 2420 which is configured to select a return address from multiplexor 221A, and select signal 2422 which indicates detection of a missed prediction and is configured to select the signal 2420 for output from multiplexor 2402. In one embodiment, missed prediction circuit 2450 may be configured to always select signal 2412 for conveyance from multiplexor 2402 in the event prediction 250 indicates a prediction of taken. In this manner, missed prediction circuit 2450 may only perform detection of a missed prediction when prediction logic 220 conveys a prediction of not taken. Multiplexor 2402 is configured to convey a signal 2460 which may be configured to select a second fetch address 245 from multiplexor 221A, or may be configured to select a return address from multiplexor 221A.

Control circuit 2400 is configured to determine whether a second fetch address is necessitated by a misprediction, or a missed prediction of a RET instruction, and convey corresponding information via bus 245 and signal 223A. In one embodiment, signal 2410 includes a fetch address and an indication of a miscompare by circuit 1410. In the embodiment shown, control circuit 2400 may determine a second fetch address is required in response to detecting one of two conditions. A first condition requiring a second fetch address corresponds to detecting a prediction 250 of taken and detection of a miscompare by circuit 1410 as indicated by signal 2410. In response to detecting this first condition, control circuit is configured to convey the received address 2410 via bus 245 and a corresponding select signal 223A. In this case, select signal 223A corresponds to the signal 2412 conveyed from circuit 1430 and is configured to select signal 245 for conveyance from multiplexor 221A. A second condition requiring a second fetch address corresponds to detecting a prediction 250 of not taken and detection of a missed prediction as indicated by signal 2422. In response to detecting this second condition, control circuit 2400 conveys a select signal 223A which corresponds to signal 2420 conveyed by missed prediction circuit 2450. In this second case, the conveyed select signal 223A is configured to select a return address 230 for conveyance from multiplexor 221A. If neither the first nor second condition are detected by control circuit 2400, no second fetch address is conveyed.

Figure 25:
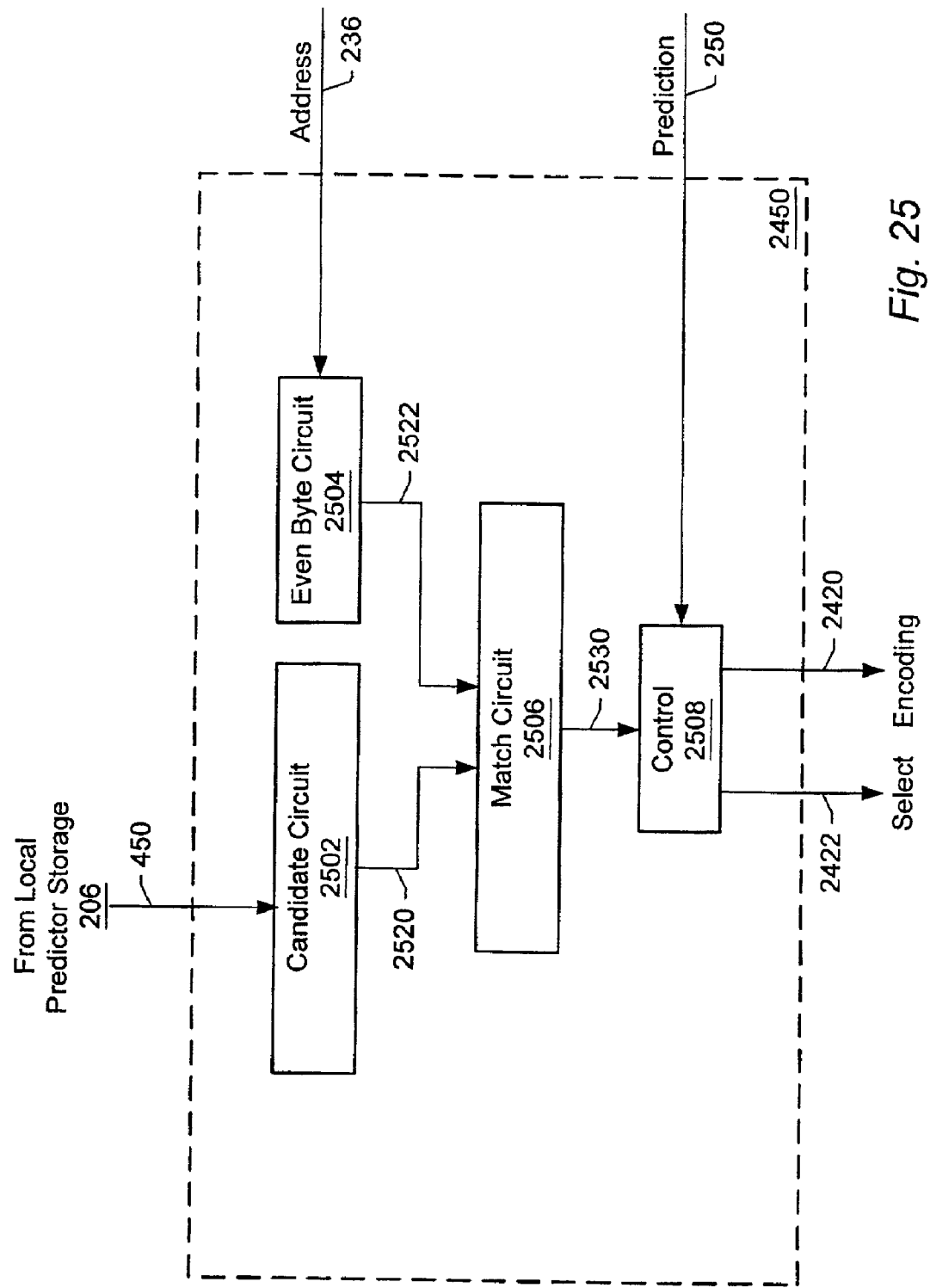
FIG. 25 is a block diagram of one embodiment of a missed prediction circuit.

FIG. 25 is a block diagram illustrating one embodiment of missed prediction circuit 2450. Missed prediction circuit 2450 includes candidate circuit 2502, even byte circuit 2504, matching circuit 2506, and control circuit 2508. Candidate circuit 2502 is coupled to receive branch information 450, even byte circuit 2504 is coupled to receive fetch address 236, and control circuit 2508 is coupled to receive prediction 250. Further, match circuit 2506 is coupled to receive signals 2520 and 2522 from candidate circuit 2502 and even byte circuit 2504, respectively. Control circuit 2508 is coupled to receive signal 2530 from match circuit 2506.

In the embodiment shown in FIG. 25, candidate circuit 2502 is configured to determine whether branch information 450 includes a valid entry corresponding to a RET instruction at an even byte position. As described above, branch information 450 may include branch information corresponding to three branch instructions 500A–500C. Utilizing the encodings shown in FIG. 15, a RET instruction may be identified as one in which branch information bit #3 is equal to binary "1". Further, end adjustment bit may be utilized to detect an instruction ending on an even byte. Branch information 500A–500C which is determined to correspond to a RET instruction on an even byte may then be considered a missed prediction candidate and may be conveyed to match circuit 2506 along with a positive indication of candidate detection. Even byte circuit 2504 is configured to determine a fetch address corresponding to an even address. In one embodiment, even byte circuit 2504 may compare a least significant bit of a received fetch address 236 in order to make this determination. If the least significant bit of the fetch address 236 is detected to equal a binary "0", an even fetch address may be determined and a corresponding positive indication 2522 may be conveyed to match circuit 2506.

In response to receiving a positive indication from circuit 2502 and 2504, match circuit 2506 is configured to detect a missed prediction candidate which corresponds the fetch address 236. In one embodiment, bits 3–1 of the offset of the fetch address 236 are compared to bits 2–0 of a candidate's branch information. As previously described, bits 2–0 of a RET instruction's branch information 506 indicate the even byte position of the RET instruction. The following table illustrates a relationship between even fetch address offsets and byte position branch information.

TABLE 1

| Even Fetch Address Offset (bits 3-0) | Branch Information Byte position (bits 2-0) |
| --- | --- |
| 0000 | 000 |
| 0010 | 001 |
| 0100 | 010 |
| 0110 | 011 |
| 1000 | 100 |
| 1010 | 101 |
| 1100 | 110 |
| 1110 | 111 |

As seen from Table 1, a direct correspondence may be made between bits 3–1 of an even fetch address offset and bits 2–0 of branch information 506. Consequently, match circuit 2506 is able to match candidate branch information corresponding to a RET instruction to the fetch address offset. In response to detecting such a match, match circuit 2506 is configured to convey a signal 2530 indicating such detection to control circuit 2508. In the exemplary embodiment shown, control circuit 2508 is configured to convey a signals configured to select a return address from multiplexor 221A, in response to detecting a not taken prediction 250 and an indication of a match 2530. In order to effect the selection of a return address 230 from multiplexor 221A, control circuit 2508 conveys signal 2422 and signal 2420. Signal 2420 is configured with an encoding to select a return address 230 from multiplexor 221A. Select signal 2422 is configured to select for output from multiplexor 2422 either signal 2412 or signal 2420. In response to detecting a not taken prediction 250 and an indication of a match 2530, signal 2422 selects signal 2420 for output from multiplexor 2402. Otherwise, signal 2422 selects signal 2412 for output from multiplexor 2402.

Figure 26:
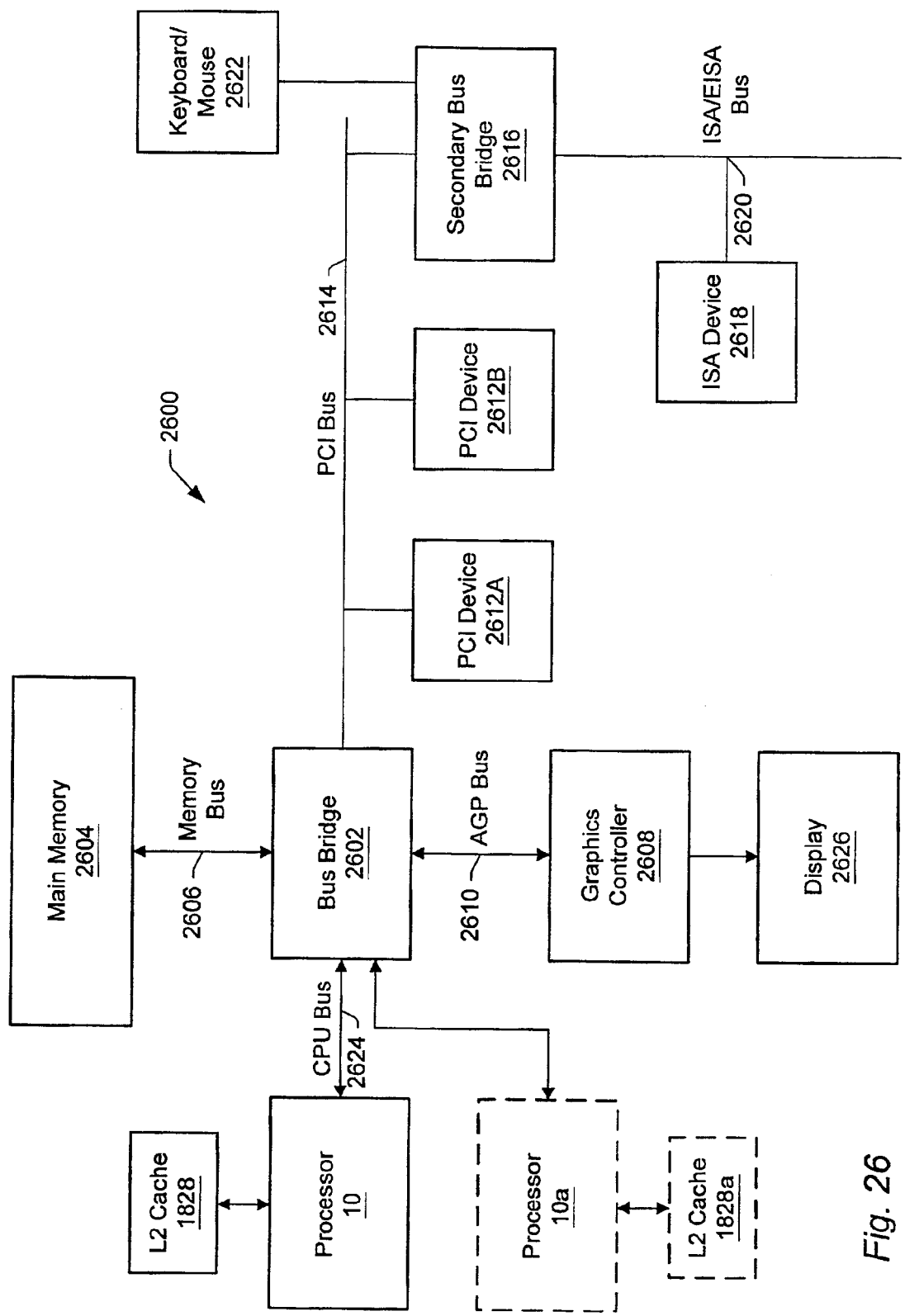
FIG. 26 is a block diagram of a computer system.

Turning now to FIG. 26, a block diagram of one embodiment of a computer system 2600 including processor 10 coupled to a variety of system components through a bus bridge 2602 is shown. Other embodiments are possible and contemplated. In the depicted system, a main memory 2604 is coupled to bus bridge 2602 through a memory bus 2606, and a graphics controller 2608 is coupled to bus bridge 2602 through an AGP bus 2610. Finally, a plurality of PCI devices 2612A–2612B are coupled to bus bridge 2602 through a PCI bus 2614. A secondary bus bridge 2616 may further be provided to accommodate an electrical interface to one or more EISA or ISA devices 2618 through an EISA/ISA bus 2620. Processor 10 is coupled to bus bridge 2602 through a CPU bus 2624 and to an optional L2 cache 1828.

Bus bridge 2602 provides an interface between processor 10, main memory 2604, graphics controller 2608, and devices attached to PCI bus 2614. When an operation is received from one of the devices connected to bus bridge 2602, bus bridge 2602 identifies the target of the operation (e.g. a particular device or, in the case of PCI bus 2614, that the target is on PCI bus 2614). Bus bridge 2602 routes the operation to the targeted device. Bus bridge 2602 generally translates an operation from the protocol used by the source device or bus to the protocol used by the target device or bus.

In addition to providing an interface to an ISA/EISA bus for PCI bus 2614, secondary bus bridge 2616 may further incorporate additional functionality, as desired. An input/output controller (not shown), either external from or integrated with secondary bus bridge 2616, may also be included within computer system 2600 to provide operational support for a keyboard and mouse 2622 and for various serial and parallel ports, as desired. An external cache unit (not shown) may further be coupled to CPU bus 2624 between processor 10 and bus bridge 2602 in other embodiments. Alternatively, the external cache may be coupled to bus bridge 2602 and cache control logic for the external cache may be integrated into bus bridge 2602. L2 cache 1828 is further shown in a backside configuration to processor 10. It is noted that L2 cache 1828 may be separate from processor 10, integrated into a cartridge (e.g. slot 1 or slot A) with processor 10, or even integrated onto a semiconductor substrate with processor 10.

Main memory 2604 is a memory in which application programs are stored and from which processor 10 primarily executes. A suitable main memory 2604 comprises DRAM (Dynamic Random Access Memory). For example, a plurality of banks of SDRAM (Synchronous DRAM) or Rambus DRAM (RDRAM) may be suitable.

PCI devices 2612A–2612B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 2618 is illustrative of various types of peripheral devices, such as a modem, a sound card, and a variety of data acquisition cards such as GPIB or field bus interface cards.

Graphics controller 2608 is provided to control the rendering of text and images on a display 2626. Graphics controller 2608 may embody a typical graphics accelerator generally known in the art to render three-dimensional data structures which can be effectively shifted into and from main memory 2604. Graphics controller 2608 may therefore be a master of AGP bus 2610 in that it can request and receive access to a target interface within bus bridge 2602 to thereby obtain access to main memory 2604. A dedicated graphics bus accommodates rapid retrieval of data from main memory 2604. For certain operations, graphics controller 2608 may further be configured to generate PCI protocol transactions on AGP bus 2610. The AGP interface of bus bridge 2602 may thus include functionality to support both AGP protocol transactions as well as PCI protocol target and initiator transactions. Display 2626 is any electronic display upon which an image or text can be presented. A suitable display 2626 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 2600 may be a multi-processing computer system including additional processors (e.g. processor 10a shown as an optional component of computer system 2600). Processor 10a may be similar to processor 10. More particularly, processor 10a may be an identical copy of processor 10. Processor 10a may be connected to bus bridge 2602 via an independent bus (as shown in FIG. 4) or may share CPU bus 2624 with processor 10. Furthermore, processor 10a may be coupled to an optional L2 cache 1828a similar to L2 cache 1828.

It is noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Numerous variations and modifications will become apparent to those skilled in the art once the above disclosure is fully appreciated. It is intended that the following claims be interpreted to embrace all such variations and modifications.

What is claimed is:

1. A method comprising:
   storing a plurality of branch marker bits, wherein each bit of said plurality of bits:
     corresponds to a different byte range within a group of contiguous instruction bytes; and
     indicates whether a predicted branch instruction ends within the corresponding byte range;
   selecting one of said plurality of branch marker bits in response to receiving a fetch address; and
   utilizing said selected branch marker bit to make a prediction.

2. The method of claim 1, further comprising storing branch prediction information corresponding to said plurality of branch marker bits, wherein said information comprises a plurality of entries each of which includes information regarding predicted taken branches.

3. The method of claim 2, wherein each of said entries indicates a type of branch instruction.

4. The method of claim 3, wherein each of said entries further indicates a past behavior of a branch.

5. The method of claim 1, further comprising determining whether any of said branch marker bits occurring before said fetch address indicates a predicted branch instruction.

6. The method of claim 5, further comprising storing branch prediction information corresponding to said plurality of branch marker bits, wherein said information comprises a plurality of entries each of which includes information regarding a predicted branch.

7. The method of claim 6, wherein the number of said plurality of entries is equal to a maximum number of branches which may be indicated as predicted by said branch marker bits at one time.

8. The method of claim 6, further comprising selecting an entry of said entries in response to detecting said selected bit is indicative of a predicted branch, wherein said selected entry is determined by a position of said selected branch marker bit relative to other bits of said branch marker bits which are also indicative of predicted branches.

9. The method as recited in claim 1, wherein selecting one of said plurality of bits comprises decoding a plurality of least significant bits of said fetch address.

10. The method as recited in claim 1, wherein the largest range of said different byte ranges includes a number of bytes equal to a number of bytes within a shortest branch instruction exclusive of a return instruction.

11. The method as recited in claim 1, wherein selecting said branch marker bit comprises identifying a first branch marker bit which corresponds to an address at or after said fetch address.

12. The method of as recited in claim 1, wherein each of said branch marker bits further indicates whether a corresponding branch instruction has previously been mispredicted.

13. A branch prediction mechanism comprising:
   a branch prediction storage coupled to receive a fetch address, wherein said branch prediction storage is configured to store a plurality of branch marker bits, wherein each bit of said bits:
     corresponds to a different byte range of a group of contiguous instruction bytes; and
     indicates whether a predicted branch instruction ends within the corresponding byte range;
   a control unit configured to:
     select one of said plurality of branch marker bits in response to receiving said fetch address; and
     utilize said selected branch marker bit to make a prediction.

14. The branch prediction mechanism of claim 13, wherein said mechanism is further configured to store branch prediction information corresponding to said plurality of branch marker bits, wherein said information comprises a plurality of entries each of which includes information regarding predicted branches.

15. The branch prediction mechanism of claim 14, wherein each of said entries indicates a type of branch instruction.

16. The branch prediction mechanism of claim 15, wherein each of said entries further indicates a past behavior of a branch.

17. The branch prediction mechanism of claim 13, wherein said control unit is further configured to determine whether any of said branch marker bits occurring before said fetch address indicates a predicted branch instruction.

18. The branch prediction mechanism of claim 17, wherein said mechanism is further configured to store branch prediction information corresponding to said plurality of branch marker bits, wherein said information comprises a plurality of entries each of which includes information regarding a predicted branch.

19. The branch prediction mechanism of claim 18, wherein the number of said plurality of entries is equal to a maximum number of branches which may be indicated as predicted by said branch marker bits at one time.

20. The branch prediction mechanism of claim 18, wherein when said selected bit is indicative of a predicted branch, said mechanism is further configured to:

determine a position of said selected bit relative to other bits of said branch marker bits which are also indicative of predicted branches; and determine which of said plurality of entries corresponds to said selected bit.

21. The branch prediction mechanism of claim 18, wherein said mechanism is further configured to select an entry of said entries in response to detecting said selected bit is indicative of a predicted branch, wherein said selected entry is determined by a position of said selected branch marker bit relative to other bits of said branch marker bits which are also indicative of predicted branches.

22. The branch prediction mechanism as recited in claim 13, wherein selecting one of said plurality of bits comprises decoding a plurality of least significant bits of said fetch address.

23. The branch prediction mechanism as recited in claim 13, wherein the largest range of said different byte ranges includes a number of bytes equal to a number of bytes within a shortest branch instruction exclusive of a return instruction.

24. The branch prediction mechanism as recited in claim 13, wherein said control unit is further configured to identify a first branch marker bit which corresponds to an address at or after said fetch address.

25. The branch prediction mechanism as recited in claim 13, wherein each of said branch marker bits further indicates whether a corresponding branch instruction has previously been mispredicted.

26. A microprocessor comprising:

an instruction cache coupled to receive a fetch address and to provide a group of contiguous instruction bytes in response to said fetch address; and a branch prediction unit coupled to receive said fetch address concurrently with said instruction cache, wherein said branch prediction unit is configured to:

store a plurality of branch marker bits, wherein each bit of said bits:

corresponds to a different byte range of a group of contiguous instruction bytes; and indicates whether a predicted branch instruction ends within the corresponding byte range;

select one of said plurality of branch marker bits in response to receiving said fetch address; and utilize said selected branch marker bit to make a prediction.

27. The microprocessor of claim 26, wherein said branch prediction unit is further configured to store branch prediction information corresponding to said plurality of branch marker bits, wherein said information comprises a plurality of entries each of which includes information regarding a predicted branch.

28. The microprocessor of claim 27, wherein said branch prediction unit is further configured to:

determine a position of said selected bit relative to other bits of said branch marker bits; and determine which of said plurality of entries corresponds to said selected bit.

29. The microprocessor of claim 26, wherein said branch prediction unit is further configured to identify a first branch marker bit which corresponds to an address at or after said fetch address.

* * * * *